(12) United States Patent
Ikeda

(10) Patent No.: US 10,819,720 B2
(45) Date of Patent: Oct. 27, 2020

(54) INFORMATION PROCESSING DEVICE, INFORMATION PROCESSING SYSTEM, INFORMATION PROCESSING METHOD, AND STORAGE MEDIUM

(71) Applicant: NEC Corporation, Minato-ku, Tokyo (JP)

(72) Inventor: Satoshi Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 226 days.

(21) Appl. No.: 15/735,256

(22) PCT Filed: Jun. 15, 2016

(86) PCT No.: PCT/JP2016/002894
§ 371 (c)(1),
(2) Date: Dec. 11, 2017

(87) PCT Pub. No.: WO2016/208158
PCT Pub. Date: Dec. 29, 2016

(65) Prior Publication Data
US 2018/0167407 A1    Jun. 14, 2018

(30) Foreign Application Priority Data
Jun. 26, 2015  (JP) .................................. 2015-128769

(51) Int. Cl.
*H04L 29/06* (2006.01)
*G06F 16/00* (2019.01)
(Continued)

(52) U.S. Cl.
CPC .......... *H04L 63/1425* (2013.01); *G06F 16/00* (2019.01); *G06F 16/35* (2019.01);
(Continued)

(58) Field of Classification Search
CPC ........... G06F 21/00; H04L 9/00; G06Q 30/00; H04B 1/00
See application file for complete search history.

(56) References Cited

U.S. PATENT DOCUMENTS

2011/0190595 A1\*  8/2011  Bennett .............. A61B 1/00016
                                                          600/301
2012/0208581 A1\*  8/2012  Ishida .................. H04B 7/0691
                                                          455/509

FOREIGN PATENT DOCUMENTS

JP     H04-030637 A    2/1992
JP     H08-227388 A    9/1996

OTHER PUBLICATIONS

Risto Vaarandi, "Real-time Classification of IDS Alerts with Data Mining Techniques", Military Communications Conference, 2009. MILCOM 2009. IEEE, pp. 1-7, Oct. 18-21, 2009.
(Continued)

*Primary Examiner* — Joseph P Hirl
*Assistant Examiner* — Leynna Truvan

(57) ABSTRACT

An information processing device according to the present invention includes: a cluster analyzer that determines a cluster identifier indicating a cluster that is a result of classifying an alert, receives a classification result of the alert, and generates alert information that is information including the alert, the cluster identifier, and the classification result; a rule generator that calculates a number of occurrence times of a pattern that is a combination of information and includes the cluster identifier, extracts a frequent pattern, generates a classification rule used in setting of the classification result, and updates a previously generated old classification rule with a newly generated classification rule; and a rule applicator that sets the classification result included in the alert information.

9 Claims, 18 Drawing Sheets

(51) Int. Cl.
*H04L 12/24* (2006.01)
*G06F 21/55* (2013.01)
*G06F 16/35* (2019.01)
*H04L 12/26* (2006.01)
*H04L 12/851* (2013.01)
*G06F 21/50* (2013.01)

(52) U.S. Cl.
CPC .......... *G06F 21/554* (2013.01); *H04L 41/069* (2013.01); *H04L 43/0876* (2013.01); *H04L 47/2441* (2013.01); *H04L 63/20* (2013.01); *G06F 21/50* (2013.01)

(56) References Cited

OTHER PUBLICATIONS

International Search Report for PCT Application No. PCT/JP2016/002894, dated Aug. 30, 2016.
English translation of Written opinion for PCT Application No. PCT/JP2016/002894.

\* cited by examiner

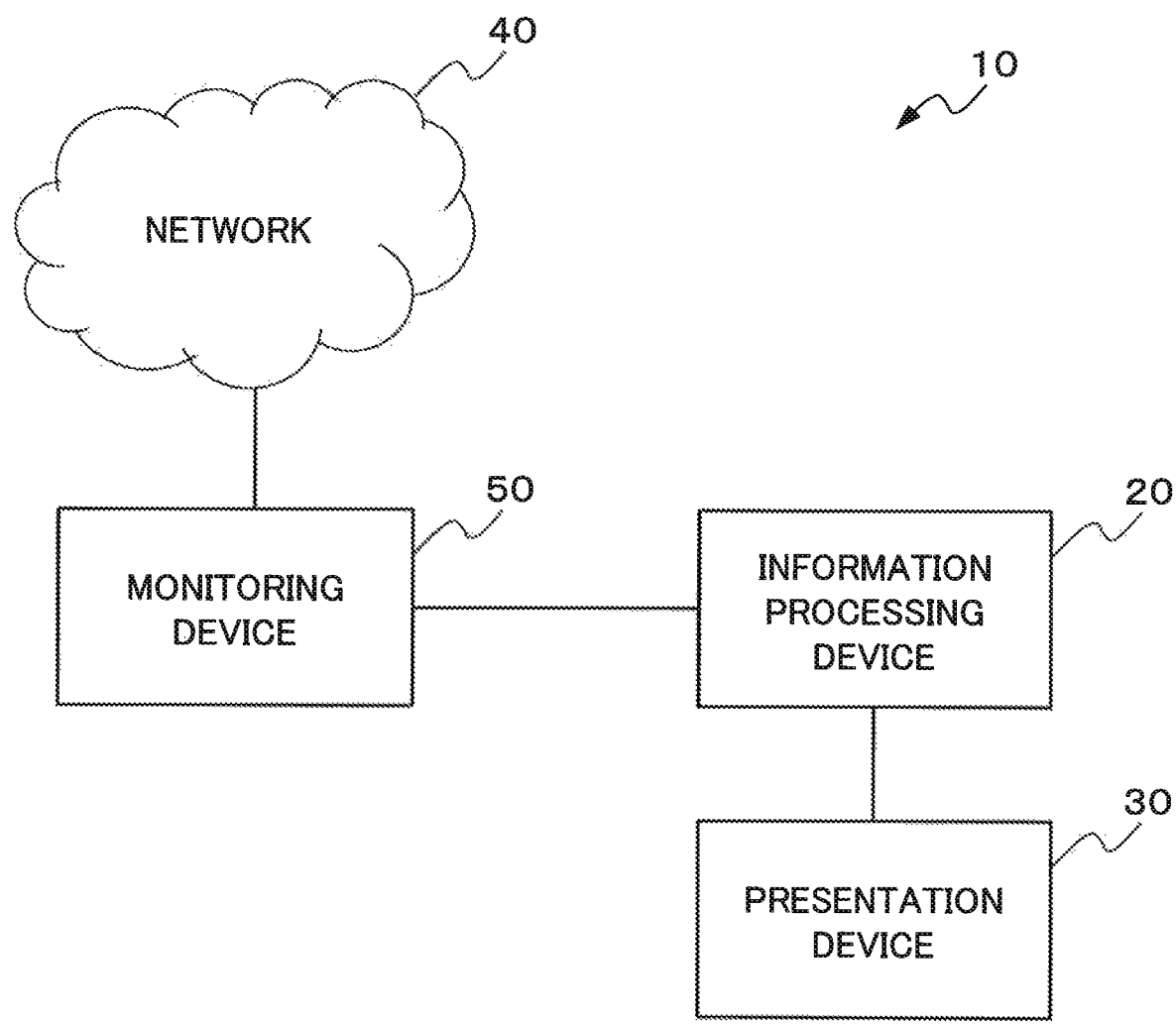

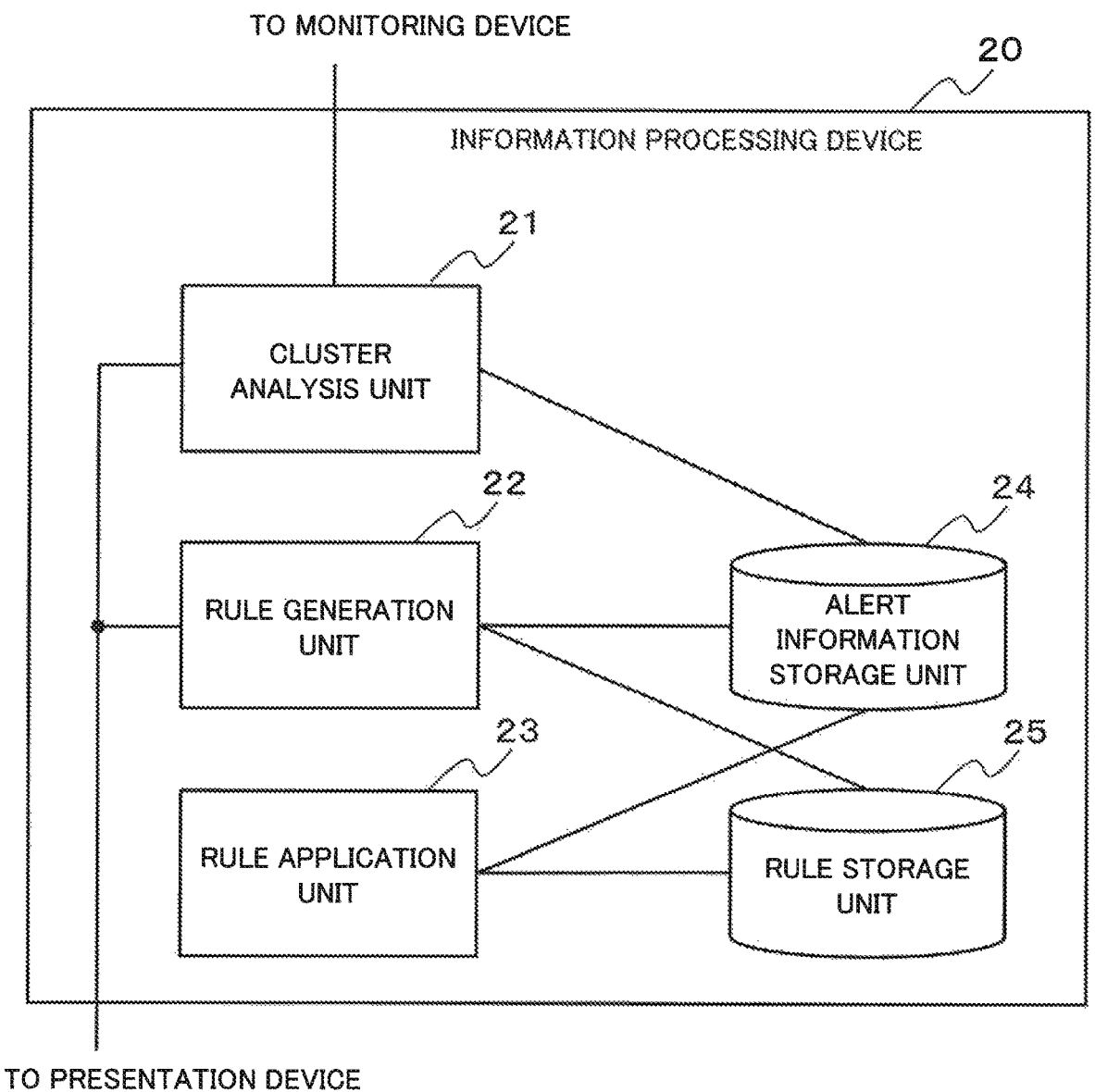

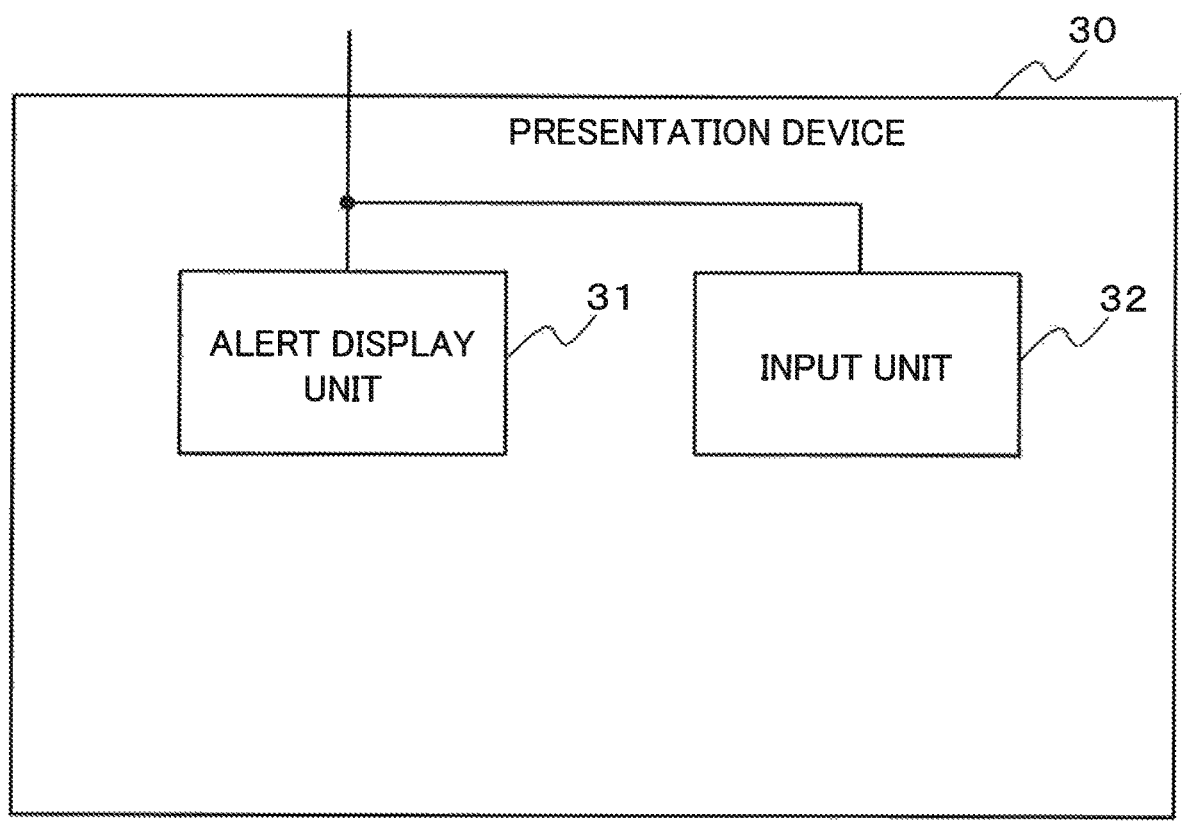

| DETECTION TIME | TRANSMISSION-SOURCE IP ADDRESS | TRANSMISSION-SOURCE PORT NUMBER | TRANSMISSION-DESTINATION IP ADDRESS | TRANSMISSION-DESTINATION PORT NUMBER | DETECTION RULE IDENTIFIER | CLUSTER IDENTIFIER | CLASSIFI-CATION RESULT | COMMUNI-CATION INFORMATION |
|---|---|---|---|---|---|---|---|---|
| 09:00:12 | 192.168.0.1 | 2000 | 10.1.0.1 | 80 | $S_1$ | 1 | TRUE DETECTION | ... |
| 09:00:13 | 192.168.0.2 | 3000 | 10.1.0.1 | 80 | $S_1$ | 1 | TRUE DETECTION | ... |
| 09:10:30 | 192.168.0.3 | 4000 | 10.1.0.2 | 8080 | $S_2$ | 2 | FALSE DETECTION | ... |
| 09:11:10 | 192.168.0.3 | 4001 | 10.1.0.3 | 8080 | $S_2$ | 2 | FALSE DETECTION | ... |
| 10:15:01 | 192.168.0.5 | 5000 | 10.1.0.3 | 8080 | $S_2$ | 2 | FALSE DETECTION | ... |
| 11:23:33 | 192.168.0.1 | 6000 | 10.1.0.4 | 22 | $S_3$ | 5 | | ... |

| | CONDITION PART | | | | | CLASSIFICATION OPERATION PART | |
|---|---|---|---|---|---|---|---|
| TRANSMISSION-SOURCE IP ADDRESS | TRANSMISSION-SOURCE PORT NUMBER | TRANSMISSION-DESTINATION IP ADDRESS | TRANSMISSION-DESTINATION PORT NUMBER | DETECTION RULE IDENTIFIER | CLUSTER IDENTIFIER | CLASSIFICATION RESULT | |
| * | * | 10.1.0.1 | 80 | $S_1$ | 1 | TRUE DETECTION | |
| * | * | * | 8080 | $S_2$ | 2 | FALSE DETECTION | |
| 192.168.0.5 | * | * | 22 | $S_4$ | 5 | FALSE DETECTION | |

Fig.6

| | FREQUENT PATTERN | | | | DETECTION RULE IDENTIFIER | CLUSTER IDENTIFIER | CLASSIFICATION RESULT | NUMBER OF OCCURRENCE TIMES | LEVEL OF DETAIL |
|---|---|---|---|---|---|---|---|---|---|
| TRANSMISSION-SOURCE IP ADDRESS | TRANSMISSION-SOURCE PORT NUMBER | TRANSMISSION-DESTINATION IP ADDRESS | TRANSMISSION-DESTINATION PORT NUMBER | | | | | | |
| * | * | 10.1.0.1 | 80 | $S_1$ | 1 | TRUE DETECTION | 50 | 7 |
| * | * | * | 80 | $S_1$ | 1 | TRUE DETECTION | 70 | 6 |
| * | * | * | 80 | $S_1$ | 1 | * | 75 | 6 |
| * | * | * | 8080 | $S_2$ | 2 | FALSE DETECTION | 100 | 6 |
| * | * | 10.1.0.3 | 8080 | $S_2$ | * | FALSE DETECTION | 200 | 3 |
| 192.168.0.5 | * | * | 22 | $S_4$ | 5 | FALSE DETECTION | 200 | 7 |

600 — 601 FREQUENT PATTERN, 602, 603, 604, 605, 606, 607, 608, 609, 610

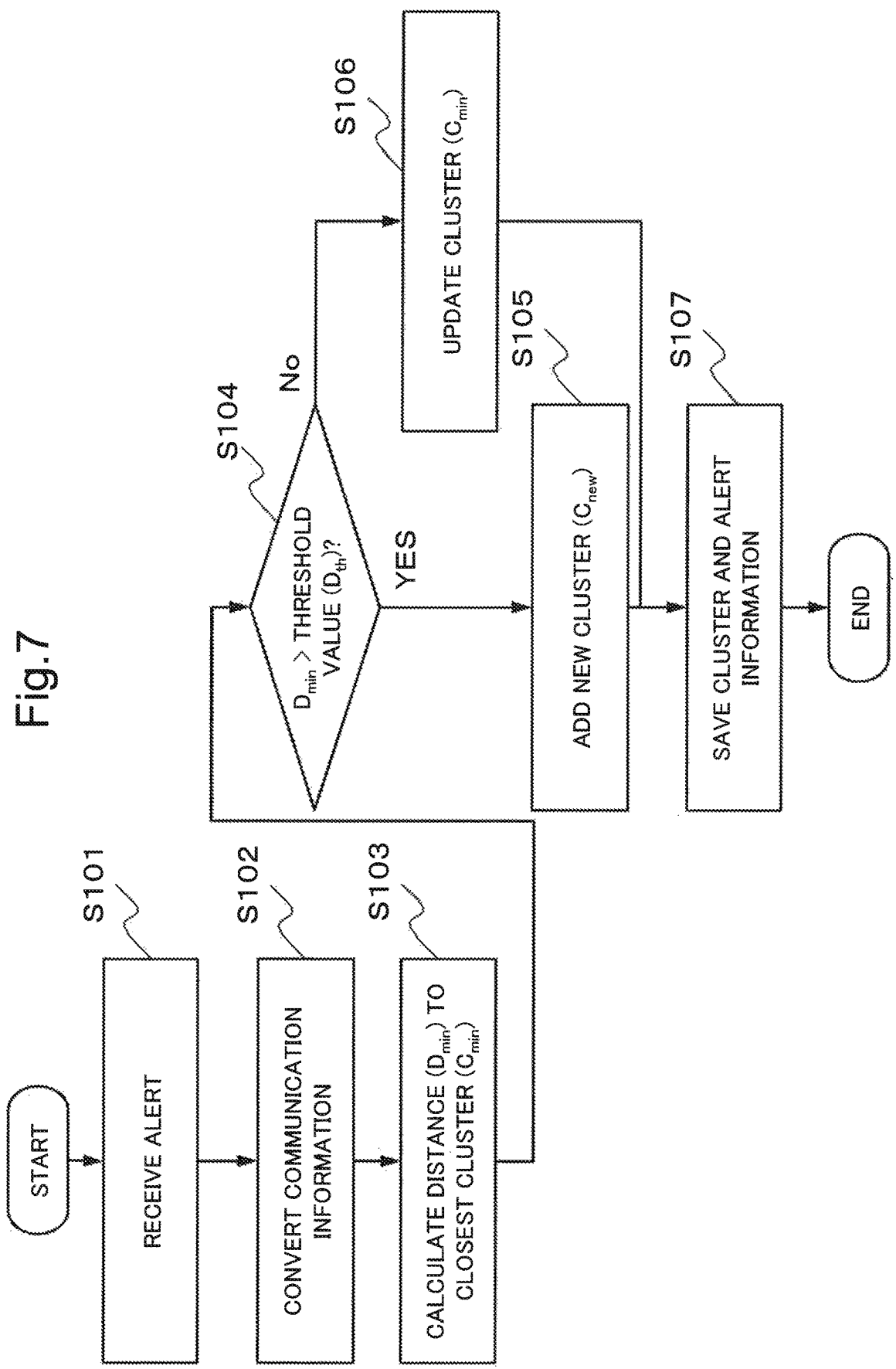

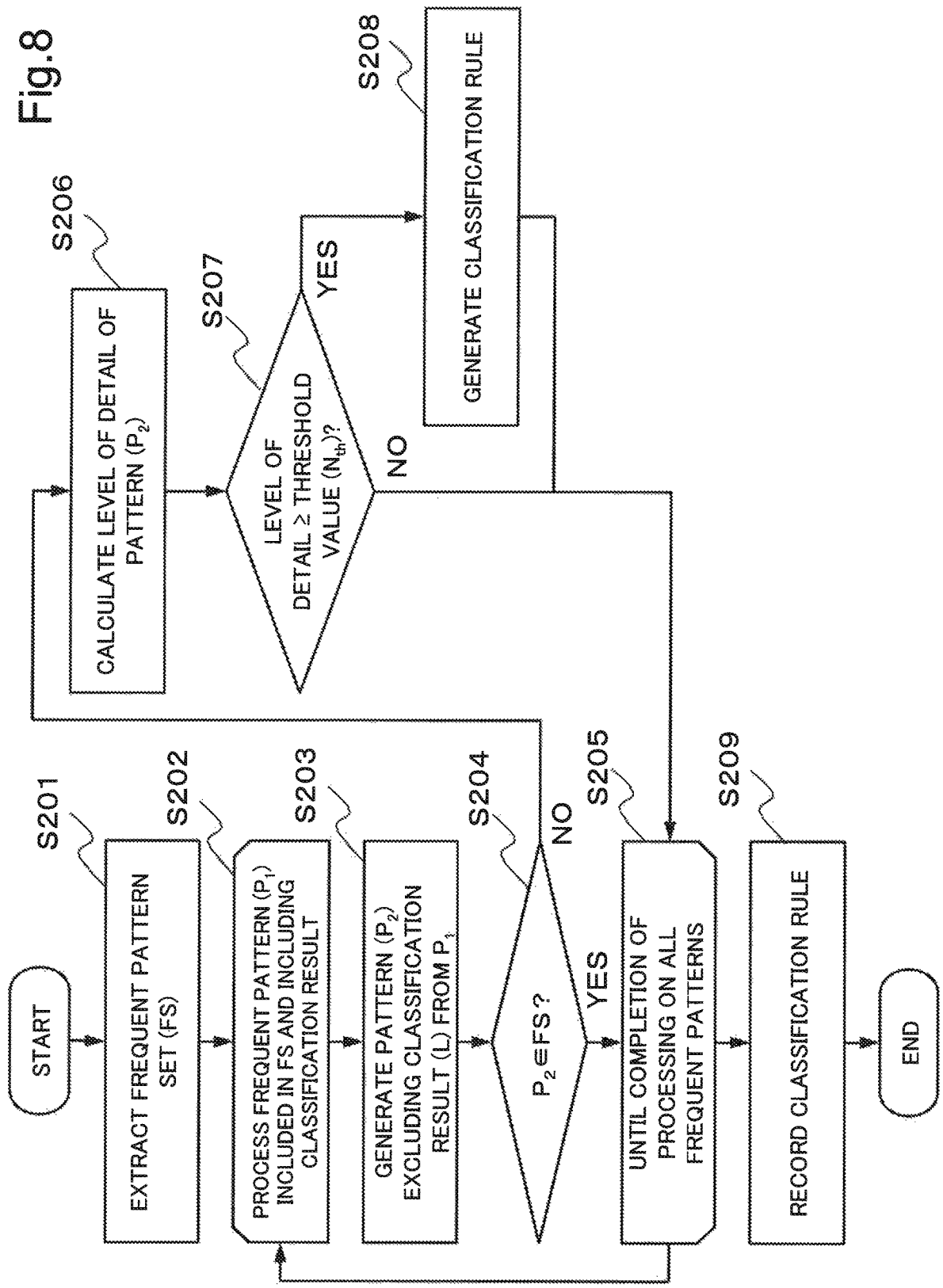

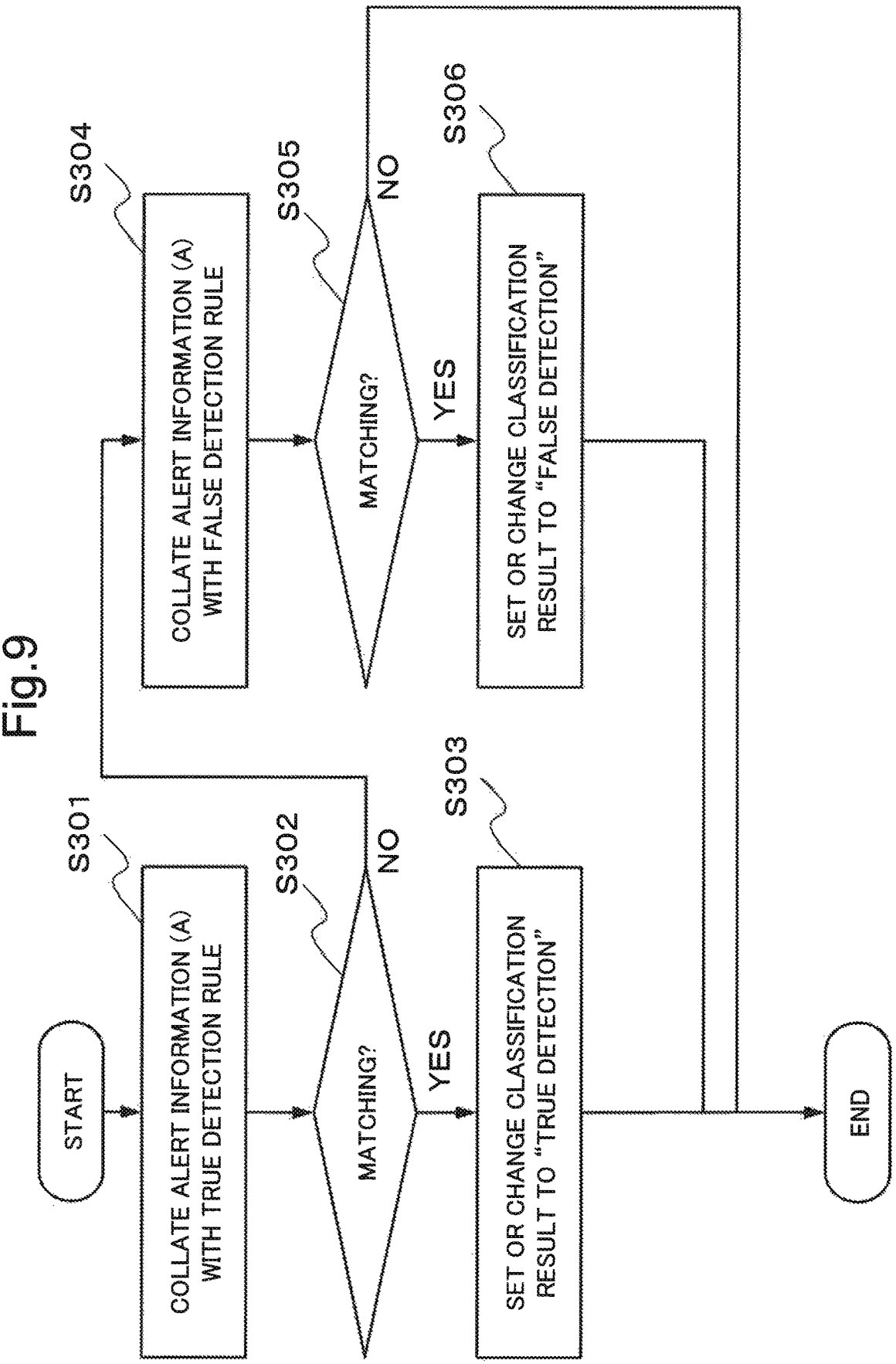

Fig.13

| | Condition Part 501 | | | | Detection Rule Identifier 505 | Cluster Identifier 507 | Classification Operation Part 509 | Valid Flag 510 |
|---|---|---|---|---|---|---|---|---|
| Transmission-Source IP Address 502 | Transmission-Source Port Number 503 | Transmission-Destination IP Address 504 | Transmission-Destination Port Number 505 | | | | Classification Result 508 | |
| * | * | 10.1.0.1 | 80 | $S_1$ | 1 | True Detection | 1 |
| * | * | * | 8080 | $S_2$ | 2 | False Detection | 1 |
| 192.168.0.5 | * | * | 22 | $S_4$ | 5 | False Detection | 0 |

550

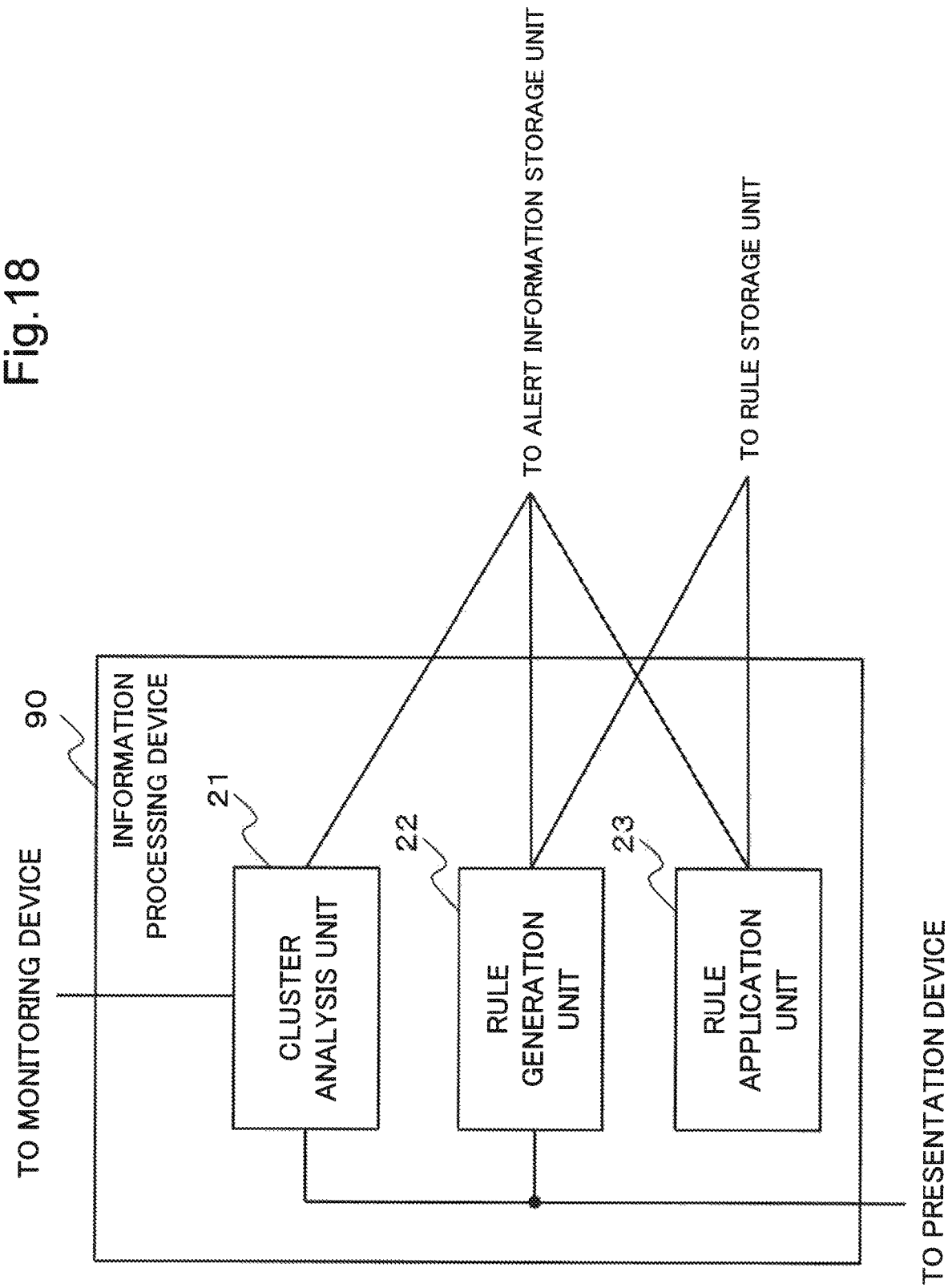

INFORMATION PROCESSING DEVICE, INFORMATION PROCESSING SYSTEM, INFORMATION PROCESSING METHOD, AND STORAGE MEDIUM

This application is a National Stage Entry of PCT/JP2016/002894 filed on Jun. 15, 2016, which claims priority from Japanese Patent Application 2015-128769 filed on Jun. 26, 2015, the contents of all of which are incorporated herein by reference, in their entirety.

TECHNICAL FIELD

The present invention relates to information communication, and particularly, relates to an information processing device, an information processing system, an information processing method, and a storage medium for monitoring communication.

BACKGROUND ART

A device for monitoring a network that communicates information monitors communication by using a firewall, an intrusion detection system (IDS), or the like and interrupts the communication as needed, in order to prevent an attack or an intrusion on a monitoring-target network. In recent years, a targeted attack aiming at theft of intellectual property or confidential information has been increasing. Thus, a demand for cybersecurity for a network is increasing. As a technique of implementing the cybersecurity, a technique of monitoring a network and dealing with an incident by using a security operation center (SOC) is commonly acknowledged.

A device for monitoring a network classifies, based on a risk, an alert detected by monitoring equipment that implements a function of a firewall, an IDS, or the like (see NPL 1, for example). Note that the alert is a message for calling an attention. For example, the alert is a message for notifying detection of an anomaly in a network.

However, the alert that the monitoring equipment generates based on detection includes an alert that does not need to be reported as an incident. For example, the alert detected by the monitoring equipment includes an alert that is low in risk, or an alert that is false detection.

Thus, an operator who carries out network monitoring work classifies an alert by referring to information as described below, specifically, information included in a detected alert or external information, and sets a risk for the alert. Then, the device for monitoring a network reports, based on the risk set by the operator, the detected alert as an alert corresponding to an incident as needed.

Note that the information that is referred to in classification described above includes, for example, a detection rule by which an alert is detected, an internet protocol (IP) address and a port number of a transmission-source host, and an IP address and a port number of a transmission-destination host. Alternatively, the information that is referred to in classification described above includes, for example, importance assigned to a detection rule used for detecting an alert by a security vender, and communication information included in communication (a packet, for example) that is a cause of detection.

A system described in NPL 1 classifies a frequently occurring alert (a routine alert). More specifically, the system described in NPL 1 regards a signature (an identifier for a detection rule), an IP address and a port number of a transmission-source host, and an IP address and a port number of a transmission-destination host that are included in an alert, as one transaction. Then, the system described in NPL 1 defines a transaction included in a frequently occurring alert as a frequent pattern, and executes mining for the frequent pattern. Further, the system described in NPL 1 extracts a frequent closed item-set, based on frequent item-set mining. Then, the system described in NPL 1 uses, based on the frequent closed item-set, a pattern of a frequently occurring alert (a frequent pattern) as a rule for use in classification of an alert. Then, the system described in NPL 1 classifies a routine alert, based on the above-described rule.

The routine alert generally has high similarity to a pattern frequently occurring in the past. In addition, the routine alert generally has low importance. In other words, the routine alert is an alert that can be classified with no need for an operator's determination. Thus, the system described in NPL 1 can achieve an operator's work to be more efficient, by classifying an alert based on the above-described rule, and reducing classification work performed by an operator.

CITATION LIST

Non Patent Literature

[NPL 1] Risto Vaarandi, "Real-time Classification of IDS Alerts with Data Mining Techniques", Military Communications Conference, 2009. MILCOM 2009. IEEE, pp. 1-7, Oct. 18-21, 2009

SUMMARY OF INVENTION

Technical Problem

However, the system described in NPL 1 is unable to generate a rule based on communication information included in a detected alert. For example, importance of an alert may need to be determined based on a content of communication information included in the alert. In other words, there is a case in which a plurality of alerts determined to be matching by a technique described in NPL 1 based on the information described above (a signature, and information on a transmission-source host and a transmission-destination host, for example) may have different levels of importance. In this case, a device generating a rule for classification (a classification rule) is required to generate different classification rules corresponding to the respective levels of importance of the alerts. However, in the case described above, the technique described in NPL 1 is unable to distinguish the levels of importance of the alerts, and thus, an appropriate classification rule cannot be generated.

As described above, the technique described in NPL 1 has an issue that there is a case in which an appropriate classification rule cannot be generated.

An object of the present invention is to provide an information processing device, an information processing system, an information processing method, and a storage medium that solve the above-described problem and generate an appropriate classification rule.

Solution to Problem

An information processing device according to one aspect of the present invention includes: a cluster analyzer that determines, based on communication information that is communicated information included in an alert, a cluster identifier indicating a cluster that is a result of classifying the alert, receives a classification result that is a classification as to whether the alert is true detection or false detection, and generates alert information that is information including the alert, the cluster identifier, and the classification result; a rule generator that calculates, for the alert information, a number of occurrence times of a pattern that is a combination of information included in the alert information and includes at least the cluster identifier, extracts a frequent pattern that is a pattern with a larger number of occurrence times than a predetermined threshold value, generates, based on the frequent pattern extracted, a classification rule used in setting or updating of the classification result associated with the alert, and updates a previously generated old classification rule with a newly generated classification rule; and a rule applicator that sets or updates the classification result included in the alert information, based on the classification rule.

An information processing system according to one aspect of the present invention includes: the above information processing device; and a presentation device. The presentation device that includes an alert display that receives the alert information from the information processing device, and displays the received alert information, and an inputter that receives an input of the classification result for the displayed alert information, and transmits the received input to the information processing device.

An information processing method according to one aspect of the present invention includes: determining, based on communication information that is communicated information included in the alert, a cluster identifier indicating a cluster that is a result of classifying an alert; receiving a classification result that is a classification as to whether the alert is true detection or false detection; generating alert information that is information including the alert, the cluster identifier, and the classification result; calculating, for the alert information, a number of occurrence times of a pattern that is a combination of information included in the alert information and includes at least the cluster identifier; extracting a frequent pattern that is a pattern with a larger number of occurrence times than a predetermined threshold value; generating, based on the frequent pattern extracted, a classification rule used in setting or updating of the classification result associated with the alert; updating a previously generated old classification rule with a newly generated classification rule; and setting or updating the classification result included in the alert information, based on the classification rule.

A computer readable non-transitory storage medium according to one aspect of the present invention embodies a program causing a computer to perform a method. The method includes: determining, based on communication information that is communicated information included in the alert, a cluster identifier indicating a cluster that is a result of classifying an alert; receiving a classification result that is a classification as to whether the alert is true detection or false detection; generating alert information that is information including the alert, the cluster identifier, and the classification result; calculating, for the alert information, a number of occurrence times of a pattern that is a combination of information included in the alert information and includes at least the cluster identifier; extracting a frequent pattern that is a pattern with a larger number of occurrence times than a predetermined threshold value; generating, based on the frequent pattern extracted, a classification rule used in setting or updating of the classification result associated with the alert; updating a previously generated old classification rule with a newly generated classification rule; and setting or updating the classification result included in the alert information, based on the classification rule.

Advantageous Effects of Invention

Based on the present invention, an advantageous effect of generating an appropriate classification rule can be exhibited.

BRIEF DESCRIPTION OF DRAWINGS

FIG. 1 is a block diagram illustrating an example of a configuration of an information processing system that includes an information processing device according to a first example embodiment of the present invention;

FIG. 2 is a block diagram illustrating an example of a configuration of the information processing device according to the first example embodiment;

FIG. 3 is a block diagram illustrating an example of a configuration of a presentation device according to the first example embodiment;

FIG. 4 is a diagram illustrating an example of alert information according to the first example embodiment;

FIG. 5 is a diagram illustrating an example of a classification rule according to the first example embodiment;

FIG. 6 is a diagram illustrating an example of a frequent pattern set for use in description of the first example embodiment;

FIG. 7 is a flowchart illustrating an example of an operation of clustering in a cluster analysis unit according to the first example embodiment;

FIG. 8 is a flowchart illustrating an example of an operation of generating a classification rule in a rule generation unit according to the first example embodiment;

FIG. 9 is a flowchart illustrating an example of an operation of applying a classification rule in a rule application unit according to the first example embodiment;

FIG. 13 is a diagram illustrating an example of a classification rule according to the second example embodiment;

FIG. 18 is a block diagram illustrating an example of a configuration of an information processing device according to a modification example.

DESCRIPTION OF EMBODIMENTS

Figure 10:
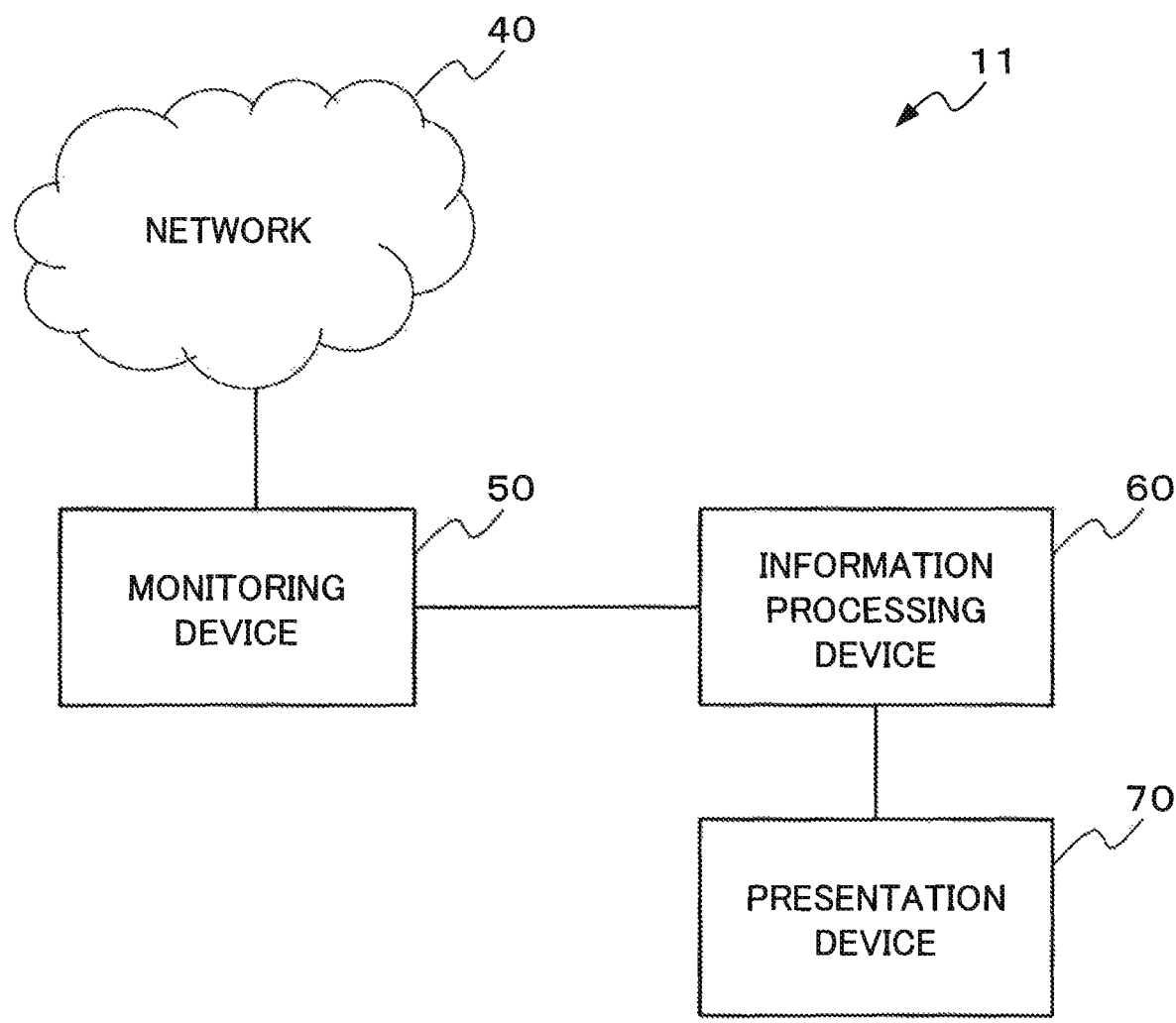
FIG. 10 is a block diagram illustrating an example of a configuration of an information processing system that includes an information processing device according to a second example embodiment.

Next, example embodiments of the present invention will be described in detail with reference to the drawings.

The respective drawings are for describing the example embodiments of the present invention. However, the present invention is not limited to the description of the drawings. In addition, like components are assigned with like numerals throughout the drawings, and repeated description therefor may be omitted.

In addition, the drawings used in the following description may omit description for a configuration of a part unrelated to the description of the present invention, and may not illustrate the configuration.

First Example Embodiment

First, a configuration according to a first example embodiment of the present invention will be described.
[Description of Configuration]

FIG. 1 is a block diagram illustrating an example of a configuration of an information processing system 10 that includes an information processing device 20 according to the first example embodiment of the present invention.

As illustrated in FIG. 1, the information processing system 10 includes the information processing device 20, a presentation device 30, a network 40, and a monitoring device 50.

The network 40 is a monitoring target in the present example embodiment, in other words, in the information processing system 10. The network 40 according to the present example embodiment is not limited to a particular network. For example, the network 40 may be an intracompany network for limited use within a predetermined range. Alternatively, the network 40 is not limited to a physical network, but may be a logical network such as a virtual local area network (VLAN). Thus, detailed description of the network 40 will be omitted.

The monitoring device 50 monitors communication information in the network 40. In addition, the monitoring device 50 detects, based on a predetermined detection rule, an anomaly of communication occurring in the network 40. The anomaly of communication occurring in the network 40 herein is, for example, an anomaly occurring due to an attack on the network 40 from outside or an operation of the network 40. Then, the monitoring device 50 notifies the information processing device 20 of a detection result (the detected anomaly) as an alert. The monitoring device 50 according to the present example embodiment is not limited to a particular device, but is a generally used device for monitoring the network 40. Thus, detailed description of the monitoring device 50 will be omitted.

However, in the present example embodiment, an alert includes communication information. The communication information is information used in communication. For example, the communication information is a byte string included as a payload of a packet used in communication, or a character string included in a hyper text transfer protocol (HTTP) request or an HTTP response. However, the communication information is not limited to the above, but may be other information.

The information processing device 20 analyzes an alert. A configuration and an operation of the information processing device 20 will be described later in detail.

The presentation device 30 presents, to an operator of the information processing system 10, information (alert information, for example) analyzed by the information processing device 20. In addition, the presentation device 30 transmits an instruction (a classification result of the alert information, for example) from the operator to the information processing device 20.

FIG. 3 is a block diagram illustrating an example of a configuration of the presentation device 30 according to the first example embodiment.

As illustrated in FIG. 3, the presentation device 30 includes an alert display unit 31 and an input unit 32.

The alert display unit 31 receives, from the information processing device 20, information (alert information or a classification rule, for example) analyzed by the information processing device 20. Hereinafter, description will be given by using alert information as an example of the information.

Then, the alert display unit 31 displays the received alert information. The information displayed by the alert display unit 31 is information for an operator to input an instruction to the input unit 32. Thus, the alert display unit 31 may omit display of part of items included in the alert information. In addition, the alert display unit 31 may display information different from the received information.

The input unit 32 receives an input (instruction) from an operator, and transmits the input to the information processing device 20.

The input of an operator herein is, for example, an input (instruction) of a classification result of the alert information, which will be described later. In this case, the input unit 32 receives an input of the classification result (true detection or false detection) that is a result of determination of an operator with respect to the alert information displayed by the alert display unit 31. Note that the "classification result" is information representing a classification as to whether an alert is true detection or false detection. Then, the input unit 32 transmits the received input (instruction) of an operator to the information processing device 20.

The information processing device 20 stores received information in the classification result of the alert information. For example, when the information processing device 20 receives a classification result from the presentation device 30, the information processing device 20 stores (overwrites) a value of the received classification result in the stored classification result.

Next, the information processing device 20 according to the first example embodiment will be described in further detail with reference to the drawings.

FIG. 2 is a block diagram illustrating an example of a configuration of the information processing device 20 according to the first example embodiment.

As illustrated in FIG. 2, the information processing device 20 includes a cluster analysis unit 21, a rule generation unit 22, a rule application unit 23, an alert information storage unit 24, and a rule storage unit 25.

The cluster analysis unit 21 receives an alert from the monitoring device 50. Then, the cluster analysis unit 21 classifies (clusters) the alert into a cluster, based on communication information included in the alert. Note that information indicating a cluster determined by the cluster analysis unit 21 will be hereinafter referred to as a "cluster identifier". A method used as clustering by the cluster analysis unit 21 is not limited to a particular method. For example, the cluster analysis unit 21 may use, for clustering, similarity of the communication information included in the alert.

Note that the cluster analysis unit 21 may receive the alert indirectly, rather than receiving the alert directly. Alternatively, the cluster analysis unit 21 may execute an operation to be described below on the alert stored in a not-illustrated storage device.

As already described, the cluster analysis unit 21 receives a classification result of the alert from the presentation device 30.

Then, the cluster analysis unit 21 stores the alert in the alert information storage unit 24 with associating the cluster identifier indicating the cluster into which the alert is classified with the classification result for the alert. These pieces of information to be stored in the alert information storage unit 24 in association with one another will be hereinafter collectively referred to as "alert information". In other words, the alert information is information including the alert, the cluster identifier, and the classification result. In addition, the cluster analysis unit 21 is also a configuration of summarizing above-described pieces of information and generating the alert information. Note that the alert information will be described later in detail.

However, in the present example embodiment, a configuration of generating alert information is not necessarily limited to the cluster analysis unit 21. For example, the rule application unit 23 may generate alert information by receiving an alert and a cluster identifier from the cluster analysis unit 21 and adding a classification result.

The rule generation unit 22 generates a classification rule used for classifying an alert based on the alert information stored in the alert information storage unit 24. The rule generation unit 22 stores the generated classification rule in the rule storage unit 25. Note that the classification rule will be described later in detail.

The rule application unit 23 applies the classification rule stored in the rule storage unit 25 to the alert information stored in the alert information storage unit 24, and sets a result of application for the classification result included in the alert information. Note that, when the classification result for which the classification rule is applied and an already stored classification result are different, the rule application unit 23 updates the classification result.

The alert information storage unit 24 stores the alert information.

The alert information storage unit 24 may store the alert information as one set of data. Alternatively, the alert information storage unit 24 may store an alert, information indicating a cluster, and a classification result as separate pieces of data, and may store information representing relevance among these pieces of data. However, in the following description, it is assumed that the alert information storage unit 24 stores the alert information as one set of data.

FIG. 4 is a diagram illustrating an example of alert information 400 stored by the alert information storage unit 24 according to the first example embodiment. As illustrated in FIG. 4, the alert information 400 includes a detection time 401, a transmission-source IP address 402, a transmission-source port number 403, a transmission-destination IP address 404, and a transmission-destination port number 405. The alert information 400 further includes a detection rule identifier 406, a cluster identifier 407, a classification result 408, and communication information 409. In other words, the alert information 400 is configured as a set of information including these items. In FIG. 4, each row indicates each piece of the alert information 400.

In the alert information 400 illustrated in FIG. 4, information included in an alert is the detection time 401, the transmission-source IP address 402, the transmission-source port number 403, the transmission-destination IP address 404, the transmission-destination port number 405, the detection rule identifier 406, and the communication information 409.

Next, each piece of information included in the alert information 400 illustrated in FIG. 4 will be described.

The cluster identifier 407 is a result of clustering in the cluster analysis unit 21.

The classification result 408 is a classification result of the alert information 400 received from the presentation device 30 or applied by the rule application unit 23.

The detection time 401 is a time at which the monitoring device 50 detects an alert.

The transmission-source IP address 402 and the transmission-source port number 403 are information indicating a transmission source of communication relating to the detected alert.

The transmission-destination IP address 404 and the transmission-destination port number 405 are information indicating a transmission destination of communication relating to the detected alert.

The detection rule identifier 406 is information for identifying a rule used in detection by the monitoring device 50.

The communication information 409 is specifically communicated information in communication relating to the detected alert. As already described, the communication information 409 is, for example, a byte string included as a payload of a packet used in communication, or a character string included in an HTTP request or an HTTP response.

Note that, in the following description, it is assumed that the classification result 408 takes "True detection", "False detection", and "Blank" as a value. "Blank" herein indicates that an alert is unclassified. Note that "Blank" is also an initial value when the alert information 400 is stored in the alert information storage unit 24. However, the classification result 408 in the present example embodiment is not limited to the above, but may take another value.

The alert information 400 illustrated in FIG. 4 will be described in further detail. Note that, in the following description, both an IP address and a port number are indicated together by using ":". For example, "192.168.0.1:2000" indicates that an IP address is "192.168.0.1" and a port number is "2000".

The alert information 400 depicted on the first row in FIG. 4 is the alert information 400 corresponding to an alert detected by the monitoring device 50 based on a detection rule "S1" at a time "9:00:12". The alert is an alert relating to communication from a transmission source of "192.168.0.1:2000" to a transmission destination of "10.1.0.1:80".

Further, the alert is an alert classified by the cluster analysis unit 21 into a cluster indicated by a cluster identifier "1". Hereinafter, a cluster indicated by a cluster identifier will be simply referred to as a cluster "cluster identifier (1, for example)".

In addition, the classification result 408 of the alert information 400 is "True detection". In other words, the alert information 400 is the correctly detected alert information 400.

The same applies to other alerts. However, blank in the classification result 408 of the alert information 400 depicted on the sixth row indicates "unclassified".

Note that the alert information 400 may include other information in addition to the above-described information. Alternatively, the alert information 400 may not include part of the information illustrated in FIG. 4 except the communication information 409 and the cluster identifier 407, as long as an operation to be described later can be achieved.

The rule storage unit 25 stores the classification rule generated by the rule generation unit 22.

The rule storage unit 25 may store the classification rule as one set of data. Alternatively, the rule storage unit 25 may store pieces of information included in the classification rule as separate pieces of data, and may store information representing relevance among these pieces of data. In the following description, it is assumed that the rule storage unit 25 stores the classification rule as one set of data.

FIG. 5 is a diagram illustrating an example of a classification rule 500 stored by the rule storage unit 25 according to the first example embodiment. As illustrated in FIG. 5, the classification rule 500 includes a condition part 501 and a classification operation part 509. In other words, the classification rule 500 is configured as set of information. In FIG. 5, each row indicates the classification rule 500.

The condition part 501 includes a condition used for determining matching. The condition part 501 illustrated in FIG. 5 includes, as examples, a transmission-source IP address 502, a transmission-source port number 503, a transmission-destination IP address 504, a transmission-destination port number 505, a detection rule identifier 506, and a cluster identifier 507. Note that a meaning of each piece of information illustrated in FIG. 5 is similar to that of the information illustrated in FIG. 4.

Note that the condition part 501 needs to include at least the cluster identifier 507. In other words, the condition part 501 may not include, as conditions, part or all pieces of information other than the cluster identifier 507 illustrated in FIG. 5. Alternatively, the condition part 501 may include other information as conditions.

The condition part 501 may also include, as a condition, a condition of matching with any value, without limitation to a fixed value. In FIG. 5, "*" depicted in the condition part 501 is a symbol indicating matching with any value. The any value herein includes blank. Alternatively, the condition part 501 may include, as a condition, information indicating a range.

For example, in the classification rule 500 depicted on the first row in FIG. 5, the transmission-source IP address 502 and the transmission-source port number 503 are any values. In other words, the classification rule 500 depicted on the first row matches with the alert information 400 that is communication to a transmission destination of "10.1.0.1: 80", is detected based on a detection rule "S1", and is classified into a cluster "1", even when the communication relates to any transmission source.

The classification operation part 509 of the classification rule 500 is information used by the rule application unit 23 in an operation on an alert matching with the condition part 501. In the following description, the classification operation part 509 includes a classification result 508 as an example. This classification result 508 is information similar to the classification result 408 illustrated in FIG. 4.

However, among the classification rules 500, the classification rule 500 in which the classification result 508 is "True detection" will be hereinafter referred to as a "true detection rule". In addition, the classification rule 500 in which the classification result 508 is "False detection" will be referred to as a "false detection rule".

[Description of Operation]

Next, an operation of the information processing device 20 according to the present example embodiment will be described with reference to the drawings.

FIG. 7 is a flowchart illustrating an example of an operation of clustering in the cluster analysis unit 21 according to the first example embodiment.

The cluster analysis unit 21 starts an operation upon receiving an alert from the monitoring device 50 (Step S101).

Upon receiving an alert, the cluster analysis unit 21 acquires the communication information 409 included in the received alert. Then, the cluster analysis unit 21 clusters the received alert based on similarity of the communication information 409. Note that the similarity used by the cluster analysis unit 21 in clustering is not limited to a particular similarity. In the following description, the cluster analysis unit 21 uses, as the similarity, a distance between pieces of the communication information 409, as an example. However, the cluster analysis unit 21 may use, as information (similarity) for use in clustering, other information rather than the distance between pieces of the communication information 409.

First, the cluster analysis unit 21 converts the communication information 409 of the received alert into data having a structure capable of calculating the distance between pieces of the communication information 409 (Step S102). Conversion processing in the cluster analysis unit 21 is not limited to a particular processing. In the following description, it is assumed that the cluster analysis unit 21 uses, as the data having the structure capable of calculating the distance, a histogram (H) representing a number of occurrence times of a character included in the communication information 409 with a vector, as an example.

After converting the communication information 409, the cluster analysis unit 21 calculates a distance ($D_{min}$) from the post-conversion communication information 409 (the histogram (H), for example) to a cluster ($C_{min}$) having a representative point that is closest to the communication information 409 (Step S103).

A method of calculating the distance used by the cluster analysis unit 21 is not limited to a particular method. The cluster analysis unit 21 can use various types of general distances. In view of this, in the following description, it is assumed that the cluster analysis unit 21 uses Euclidean distance.

In addition, the cluster analysis unit 21 can use, as the representative point, various types of values that can be calculated from a cluster, without limitation to a particular value. In view of this, in the following description, it is assumed that a representative point of a cluster is a mean value of data after conversion of the communication information 409 included in an alert belonging to the cluster. However, an alert belonging to each cluster is actually stored as the alert information 400.

For example, the cluster analysis unit 21 may calculate the distance ($D_{min}$) as indicated next. In other words, the cluster analysis unit 21 calculates a distance ($D_i$: i indicates a corresponding cluster) between the above-described histogram (H) and a representative point of each cluster ($C_i$: i is a subscript indicating a cluster, and is an integer equal to or more than 1). The cluster analysis unit 21 uses, as the representative point of each cluster ($C_i$), a mean value of the histogram (H) after conversion of the communication information 409 included in an alert belonging to the cluster ($C_i$), as described above. In addition, the cluster analysis unit 21 uses Euclidean distance as the distance ($D_i$), as described above.

Then, the cluster analysis unit 21 defines the cluster ($C_1$) with the distance ($D_i$) being the minimum distance ($D_{min}$) as a closest cluster ($C_{min}$).

After calculating the cluster ($C_{min}$) and the distance ($D_{min}$), the cluster analysis unit 21 compares a predetermined threshold value ($D_{th}$) with the distance ($D_{min}$) (Step S104). Note that the threshold value ($D_{th}$) is a value set in the cluster analysis unit 21 in advance.

When the distance ($D_{min}$) is larger than the threshold value ($D_{th}$) (YES at Step S104), the cluster analysis unit 21 adds a new cluster ($C_{new}$) to a set of clusters (Step S105).

Specifically, the cluster analysis unit 21 adds, to a set of clusters, a representative point of the communication information 409 (the above-described histogram (H), for example) of the received alert as the new cluster ($C_{new}$).

On the other hand, when the distance ($D_{min}$) is equal to or less than the threshold value ($D_{th}$) (NO at Step S104), the cluster analysis unit 21 updates the closest cluster ($C_{min}$) by using the communication information 409 (the histogram (H), for example) of the received alert (Step S106). Specifically, the cluster analysis unit 21 updates the representative point of the cluster ($C_{min}$) in such a way that the representative point becomes a mean value including the communication information 409 (the histogram (H), for example) of the received alert.

Then, the cluster analysis unit 21 stores a result of clustering for the received alert and the alert information 400 in the alert information storage unit 24 (Step S107). Note that the result of clustering is addition of the new cluster ($C_{new}$) in Step S105, or updating of the cluster ($C_{min}$) in Step S106.

Based on the operation above, the cluster analysis unit 21 clusters a received alert, based on a distance between pieces of the communication information 409 included in the alert. For example, the cluster analysis unit 21 sets, as clustering, the cluster identifier 407 included in the alert information 400, as illustrated in FIG. 4. In this way, the cluster analysis unit 21 sets the cluster identifier 407 by using the communication information 409. In other words, the cluster identifier 407 is a value set based on the communication information 409.

Note that, when a new cluster ($C_{new}$) is added or when a cluster ($C_{min}$) is updated, in other words, when a cluster changes, the cluster analysis unit 21 may re-set a cluster of the alert information 400 stored in the alert information storage unit 24. In other words, when a cluster changes, the cluster analysis unit 21 may update the cluster identifier 407 of the alert information 400 stored in the alert information storage unit 24.

In the description of the present example embodiment hitherto, the cluster analysis unit 21 uses the histogram (H) as conversion of the communication information 409. However, the cluster analysis unit 21 may use another structure as a structure of data after conversion of the communication information 409. For example, the cluster analysis unit 21 may use an N-gram used in retrieval. Specifically, the cluster analysis unit 21 extracts the N-gram in the communication information 409. Then, the cluster analysis unit 21 may use an occurrence frequency vector of the N-gram as data for use in clustering.

Further, the cluster analysis unit 21 may apply weight to data for use in clustering. For example, the cluster analysis unit 21 may determine weight for an N-gram by using term frequency-inverse document frequency (TF-IDF). In this case, the cluster analysis unit 21 may calculate a distance in such a way that the more alerts an N-gram occurs in, the less weight is applied to the N-gram.

In addition, in the description of the present example embodiment, the cluster analysis unit 21 uses, as a representative point of a cluster, a mean value of data after conversion of the communication information 409 belonging to the cluster. However, a method of calculating a representative point in the cluster analysis unit 21 is not necessarily limited to the above. For example, the cluster analysis unit 21 may use a median value instead of a mean value. Alternatively, in case of difficulty in calculating a mean value and a median value due to a nature of the data after conversion of the communication information 409, the cluster analysis unit 21 may use a value that can be acquired as a representative value. For example, the cluster analysis unit 21 may define the data (the above-described histogram (H), for example) used when newly generating a cluster in Step S105 described above, as a representative point of the cluster.

Next, an operation of the rule generation unit 22 will be described with reference to the drawings.

FIG. 8 is a flowchart illustrating an example of an operation of generating the classification rule 500 in the rule generation unit 22 according to the first example embodiment. Note that a start time of the operation of the rule generation unit 22 to be described below is not limited to a particular time. The rule generation unit 22 may periodically generate the classification rule 500 at a predetermined time interval. Alternatively, the rule generation unit 22 may generate the classification rule 500 at a time designated from a not-illustrated external device.

The rule generation unit 22 calculates the number of occurrence times of combinations of predetermined information (elements) included in the alert information 400 stored in the alert information storage unit 24 (hereinafter, the combination will be referred to as a "pattern"). However, the pattern in the present example embodiment includes at least the cluster identifier 407.

Then, the rule generation unit 22 extracts a set (hereinafter, referred to as a "frequent pattern set (FS)") of patterns (hereinafter, referred to as "frequent patterns") occurring in the alert information 400 for a number of times equal to or more than a predetermined threshold value ($F_{th}$) (Step S201). However, the rule generation unit 22 excludes the alert information 400 in which the classification result 408 is blank in extraction of the frequent pattern set (FS). In other words, the rule generation unit 22 extracts the frequent pattern set (FS) from the alert information 400 in which the classification result 408 is already set. Note that the rule generation unit 22 may generate a higher-rank pattern by integrating a plurality of patterns in which some items are the same and remaining items are different, and may define the generated higher-rank pattern as a frequent pattern. In this case, the rule generation unit 22 needs to define, as the frequent pattern, a pattern in which the different items are items matching any values (*) or items of a range including all values.

The elements herein are not limited to particular elements as long as the elements are any pieces of information included in the alert information 400. In addition, the threshold value ($F_{th}$) is a value set in the rule generation unit 22 in advance. For example, an operator may give the rule generation unit 22 the threshold value ($F_{th}$) as a fixed value in advance. Alternatively, the rule generation unit 22 may determine the threshold value ($F_{th}$) as appropriate in accordance with the number of pieces of the alert information 400 stored in the alert information storage unit 24.

Note that a method of extracting the frequent pattern set (FS) by the rule generation unit 22 is not limited to a particular method. For example, the rule generation unit 22 may execute processing as follows, as extraction of the frequent pattern set (FS). In other words, the rule generation unit 22 may regard a set of information included in the classification rule 500 illustrated in FIG. 5 as a transaction, and may obtain a frequent closed item-set used in frequent item-set mining.

In the above-described case, the rule generation unit 22 counts a number of occurrence times of each frequent pattern ($P_i$) in extraction of the frequent pattern set (FS).

In addition, the rule generation unit 22 may include, in the frequent pattern set (FS), information different from the information included in the alert information 400. For example, in extraction of the frequent pattern set (FS), the rule generation unit 22 may include, in a transaction, an item with a high abstraction level of information included in an alert, such as a prefix address of an IP address.

After extracting the frequent pattern set (FS), the rule generation unit 22 generates the classification rule 500 based on the frequent pattern set (FS). Specifically, the rule generation unit 22 repeats the following processing on the frequent pattern ($P_1$) included in the frequent pattern set (FS) (Step S202). However, as already described, the frequent pattern ($P_1$) may have part of items changed into items matching any values (*). In other words, the classification result 408 may be set an item matching any values (*). Thus, the rule generation unit 22 repeats the following processing on the frequent pattern ($P_1$) that includes the classification result 408 (in which the classification result 408 is not an item matching any values (*)).

The rule generation unit 22 generates the classification rule 500 for the frequent pattern ($P_1$) having the unique classification result 408.

Thus, the rule generation unit 22 first generates a pattern ($P_2$) by excluding (deleting), from the frequent pattern ($P_1$), the classification result 408 included in the frequent pattern ($P_1$) (Step S203). Hereinafter, the classification result 408 to be excluded is defined as a classification result (L). Note that the rule generation unit 22 may change the classification result 408 into an item matching any values (*) as exclusion (deletion) in Step S203. In this case, the rule generation unit 22 generates the pattern ($P_2$) by changing the classification result 408 in the frequent pattern ($P_1$) into an item matching any values (*).

Next, the rule generation unit 22 determines whether or not the pattern ($P_2$) is included in the frequent pattern set (FS) (Step S204).

When the pattern ($P_2$) is included in the frequent pattern set (FS) (YES at Step S204), the classification result (L) of an alert is not unique even when the alert matches with the pattern ($P_2$). In other words, the classification result (L) corresponding to the pattern ($P_2$) is plural. Thus, the rule generation unit 22 does not generate a rule corresponding to the frequent pattern ($P_1$) corresponding to the pattern ($P_2$) (loop at Step S205).

When the pattern ($P_2$) is not included in the frequent pattern set (FS) (NO at Step S204), the frequent pattern set (FS) is a closed item-set with respect to the pattern ($P_2$). In other words, the classification result (L) of an alert matching with the pattern ($P_2$) is unique.

However, when the rule generation unit 22 generates the classification rule 500 for all of the frequent patterns ($P_1$) satisfying this condition, there is a possibility of generating the excessive classification rule 500 for a range of a matching alert. In view of this, the rule generation unit 22 limits the frequent pattern ($P_1$) for which the classification rule 500 is generated, based on the pattern ($P_2$).

Thus, the rule generation unit 22 calculates a level of detail of the pattern ($P_2$) (Step S206).

The level of detail herein is a value representing a degree of narrowness of an application range of an alert for the pattern ($P_2$). In other words, the rule generation unit 22 needs to use, as the level of detail, a value that is designed in such a way as to take a larger value for a narrower range of an alert determined as matching when the pattern ($P_2$) is used.

For example, the rule generation unit 22 may add a predetermined value as the level of detail when the pattern ($P_2$) includes an element of a specific item. In this case, the rule generation unit 22 may change a degree of contribution to the level of detail of each item included in the alert information 400 by changing a value to be added for each item. Note that the pattern ($P_2$) is a pattern generated by deleting the classification result (L) from the frequent pattern ($P_1$) (or by setting the classification result (L) as an item matching any values (*)). In other words, the level of detail is also a degree of narrowness of an application range of an alert for the frequent pattern ($P_1$). In other words, the level of detail is a degree of narrowness of an application range of an alert for the pattern ($P_2$) and the frequent pattern ($P_1$).

After calculating the level of detail of the pattern ($P_2$), the rule generation unit 22 determines whether or not the calculated level of detail is equal to or more than a predetermined threshold value ($N_{th}$) (Step S207). The threshold value ($N_{th}$) herein is a value set in the rule generation unit 22 in advance.

When the level of detail is equal to or more than the threshold value ($N_{th}$) (YES at Step S207), the rule generation unit 22 generates the classification rule 500 by using the pattern ($P_2$) as the condition part 501 and the classification result (L) as the classification operation part 509 (Step S208).

When the level of detail is less than the threshold value ($N_{th}$) (NO at Step S207), the rule generation unit 22 does not generate the classification rule 500 and returns to Step S205.

Upon completion of processing for all of the frequent patterns ($P_1$) included in the frequent pattern set (FS), the rule generation unit 22 stores all the classification rules 500 generated in Step S208 in the rule storage unit 25 (Step S209). However, when the rule storage unit 25 already stores the classification rules 500, the rule generation unit 22 stores the generated classification rules 500 after deleting all of the old classification rules 500 stored by the rule storage unit 25. In other words, the rule generation unit 22 updates the old classification rule 500 with the generated classification rule 500. Alternatively, the rule generation unit 22 according to the present example embodiment replaces the classification rule 500 stored in the rule storage unit 25 with the generated classification rule 500.

The operation of the rule generation unit 22 will be described in further detail with reference to the drawings.

FIG. 6 is a diagram illustrating an example of a frequent pattern set 600 that includes a frequent pattern 601 for use in the following description. In other words, it is assumed that the rule generation unit 22 extracts the frequent pattern set (FS) illustrated in FIG. 6 at Step S201 in FIG. 8. Note that the frequent pattern set 600 illustrated in FIG. 6 is an example of the frequent pattern set (FS) according to the present example embodiment. The frequent pattern set (FS) according to the present example embodiment is not limited to FIG. 6.

The frequent pattern set 600 illustrated in FIG. 6 includes the frequent pattern 601 (equivalent to the frequent pattern ($P_1$)), a number of occurrence times 609, and a level of detail 610. The frequent pattern 601 includes a transmission-source IP address 602, a transmission-source port number 603, a transmission-destination IP address 604, a transmission-destination port number 605, a detection rule identifier 606, a cluster identifier 607, and a classification result 608. Each of the above-described items included in the frequent pattern 601 is similar to each of the items illustrated in FIGS. 4 and 5.

The number of occurrence times 609 and the level of detail 610 are the already described number of occurrence times and the level of detail, respectively. In FIG. 6, it is assumed that the number of occurrence times 609 and the level of detail 610 are calculated already.

Note that, in FIG. 6, the level of detail 610 is a value given by adding "4" when the cluster identifier 607 is included and adding "1" when each of other items excluding the classification result 608 is included. Further, in the following description, it is assumed that a threshold value ($N_{th}$) of the level of detail 610 is "5".

It is assumed that "<" and ">" are used for expressing a pattern. Description of an item matching any values (an item depicted by "*") included in a pattern is omitted. For example, the classification result 608 of the frequent pattern 601 depicted on the third row in FIG. 6 is an item matching any values (*) collectively indicating "True detection" and "False detection", but description thereof will be omitted below.

A pattern ($P_2$) that excludes the classification result 608 from the frequent pattern 601 on the first row is not included in the frequent patterns 601 on other rows. Note that the pattern ($P_2$) in this case is <Transmission-destination IP address=10.1.0.1, Transmission-destination port number=80, Detection rule identifier=S1, Cluster identifier=1>.

Further, the level of detail 610 (=7) of the frequent pattern 601 on the first row exceeds the threshold value ($N_{th}$=5) of the level of detail 610.

Thus, the rule generation unit 22 generates the classification rule 500 corresponding to the frequent pattern 601 on the first row. The classification rule 500 generated based on the frequent pattern 601 on the first row is the classification rule 500 depicted on the first row in FIG. 5.

A pattern ($P_2$) that excludes the classification result 608 from the frequent pattern 601 on the second row is included in the frequent pattern 601 on the third row. Note that the pattern ($P_2$) in this case is <Transmission-destination port number=80, Detection rule identifier=S1, Cluster identifier=1>.

Thus, the rule generation unit 22 does not generate the classification rules 500 corresponding to the frequent patterns 601 on the second row and the third row.

The frequent pattern 601 on the fifth row has the level of detail 610 (=3) that is less than the threshold value ($N_{th}$=5). Thus, the rule generation unit 22 does not generate the classification rule 500 corresponding to the frequent pattern 601 on the fifth row.

A pattern ($P_2$) that excludes the classification result 608 from the frequent pattern 601 on the fourth row is not included in the other frequent patterns 601. In addition, the level of detail 610 of the frequent pattern 601 on the fourth row exceeds the threshold value ($N_{th}$=5). The same applies to the frequent pattern 601 on the sixth row.

Thus, the rule generation unit 22 generates the classification rules 500 corresponding to the frequent patterns 601 on the fourth row and the sixth row. The classification rules 500 corresponding to the frequent patterns 601 on the fourth row and the sixth row are the classification rules 500 depicted on the second row and the third row in FIG. 5, respectively.

As described above, in generation of the classification rule 500, the rule generation unit 22 according to the present example embodiment adds a limitation based on the level of detail 610 to the condition part 501 of the classification rule 500. Based on the operation described above, the rule generation unit 22 according to the present example embodiment prevents excessive generation of the classification rule 500.

Further, in calculation of the level of detail 610, the rule generation unit 22 may enlarge contribution to the level of detail 610 based on the cluster identifier 407. Thereby, the rule generation unit 22 may set the threshold value ($N_{th}$) in such a way that the level of detail 610 does not exceed the threshold value ($N_{th}$) when the cluster identifier 407 is not included. In this case, the rule generation unit 22 can generate classification rules 500 that always include the cluster identifier 507 in the condition part 501.

Note that in the above description, it has been described that the rule generation unit 22 according to the present example embodiment controls a target range of application of the classification rule 500 based on the level of detail 610. However, a control means of the rule generation unit 22 according to the present example embodiment is not limited to the above. For example, the rule generation unit 22 may determine whether or not to generate the classification rule 500 based on an explicit condition of "always including a cluster identifier".

Next, an operation of the rule application unit 23 will be described with reference to the drawings.

FIG. 9 is a flowchart illustrating an example of an operation of applying a rule in the rule application unit 23 according to the first example embodiment. The rule application unit 23 starts an operation below at a timing when the cluster analysis unit 21 newly stores the alert information 400 (hereinafter referred to as alert information (A)) in the alert information storage unit 24.

The rule application unit 23 first collates the alert information (A) with a true detection rule in the classification rules 500 (Step S301).

The rule application unit 23 determines whether or not the condition part 501 included in the true detection rule matches with the alert information (A) as collation of the alert information (A) with a true detection rule (in other words, part of the classification rules 500). At this time, the rule application unit 23 determines an item depicted by "*" in the condition part 501 as matching for any value. The rule application unit 23 determines another item as matching when the item matches with a value in the condition part 501.

Then, when the alert information (A) matches with all items of the condition part 501 in any one of true detection rules, the rule application unit 23 determines that the alert information (A) matches with the true detection rule.

The rule application unit 23 determines whether or not the alert information (A) matches with at least any one of the true detection rules as a result of collation (Step S302).

When the alert information (A) matches with at least any one of the true detection rules (YES at Step S302), the rule application unit 23 determines that the alert information (A) is true detection. Then, the rule application unit 23 sets or changes the classification result 408 of the alert information (A) stored in the alert information storage unit 24 to "True detection" (Step S303). More specifically, the rule application unit 23 operates as follows.

When the classification result 408 is already set to "True detection", the rule application unit 23 operates nothing. When the classification result 408 is "False detection" or "Blank", the rule application unit 23 writes "True detection" in the classification result 408. In other words, the rule application unit 23 changes the classification result 408 to "True detection".

Alternatively, the rule application unit 23 may omit checking of a content of the classification result 408, and may always overwrite the classification result 408 with "True detection". In other words, the rule application unit 23 may always set "True detection" for the classification result 408.

When the alert information (A) does not match with any of the true detection rules (NO at Step S302), the rule application unit 23 collates the alert information (A) with a false detection rule (Step S304). A procedure of collation with a false detection rule in Step S304 is similar to that in the case of the true detection rule.

The rule application unit 23 determines whether or not the alert information (A) matches with at least any one of false detection rules as a result of collation (Step S305).

When the alert information (A) matches with at least any one of the false detection rules (YES at Step S305), the rule application unit 23 determines that the alert information (A) is false detection. Then, the rule application unit 23 sets or changes the classification result 408 of the alert information (A) stored in the alert information storage unit 24 to "False detection" (Step S306). An operation of setting or changing in Step S306 is similar to that in Step S303.

When the alert information (A) does not match with any of the false detection rules (NO at Step S305), the rule application unit 23 does not change the classification result 408 for the alert information (A). In this case, the classification result 408 of the alert information (A) stored in the alert information storage unit 24 does not change. For example, when the classification result 408 is not inputted or "Blank" that is an initial value, the classification result 408 remains "Blank".

[Description of Advantageous Effects]

Next, an advantageous effect of the present example embodiment will be described.

The information processing device 20 according to the present example embodiment can exhibit an advantageous effect of generating the appropriate classification rule 500.

The reason is as follows.

The cluster analysis unit 21 of the information processing device 20 according to the present example embodiment executes clustering of an alert, based on similarity of the communication information 409 included in the alert. Then, the alert information 400 according to the present example embodiment includes the cluster identifier 407 that is a result of clustering. Then, the cluster analysis unit 21 extracts, based on the frequently occurring alert information 400, the frequent pattern ($P_1$) that is a frequently occurring pattern. The frequent pattern ($P_1$) herein includes the cluster identifier 407. Then, the cluster analysis unit 21 generates the classification rule 500, based on the frequent pattern ($P_1$). Accordingly, the information processing device 20 is able to include, in a matching condition of the generated classification rule 500, information (the cluster identifier 407) relating to the similarity of the communication information 409 included in the alert. In other words, the information processing device 20 according to the present example embodiment is able to generate the classification rule 500 that includes a determination criterion relating to the similarity of the communication information 409.

Second Example Embodiment

Next, an information processing device 60 according to a second example embodiment will be described with reference to the drawings.

When compared with the first example embodiment, the information processing device 60 according to the present example embodiment is different in information included in a classification rule 550. More specifically, the classification rule 550 according to the present example embodiment further includes a valid flag 510, in addition to the information included in the classification rule 500 used in description of the first example embodiment.

FIG. 13 is a diagram illustrating an example of the classification rule 550 according to the second example embodiment.

As illustrated in FIG. 13, the classification rule 550 according to the present example embodiment includes the valid flag 510, in addition to the information included in the classification rule 500 illustrated in FIG. 5.

The valid flag 510 is information representing whether or not the classification rule 550 is valid. A value of the valid flag 510 is not limited to a particular value. Thus, in the following description, it is assumed that a value of "1" in the valid flag 510 indicates "Valid (True)" and a value of "0" indicates "Invalid (False)", as an example. In other words, the information processing device 60 uses the classification rule 550 in which "1" is set for the valid flag 510, and does not use the classification rule 550 in which "0" is set for the valid flag 510.

Note that it is assumed that "0", in other words, "Invalid" is set for an initial value of the valid flag 510. This is for preventing the classification rule 550 from being stored excessively. However, the information processing device 60 may set the initial value as "1 (valid)" for preferentially saving the classification rule 550.

Next, a configuration of the information processing device 60 according to the second example embodiment will be described with reference to the drawings.

FIG. 10 is a block diagram illustrating an example of a configuration of an information processing system 11 that includes the information processing device 60 according to the second example embodiment. As illustrated in FIG. 10, when compared with the information processing system 10 according to the first example embodiment, the information processing system 11 is different in that the information processing device 60 and a presentation device 70 are included in place of the information processing device 20 and the presentation device 30. Thus, description of a configuration and an operation similar to those in the first example embodiment will be hereinafter omitted, and a configuration and an operation different from those in the first example embodiment will be mainly described.

Figure 11:
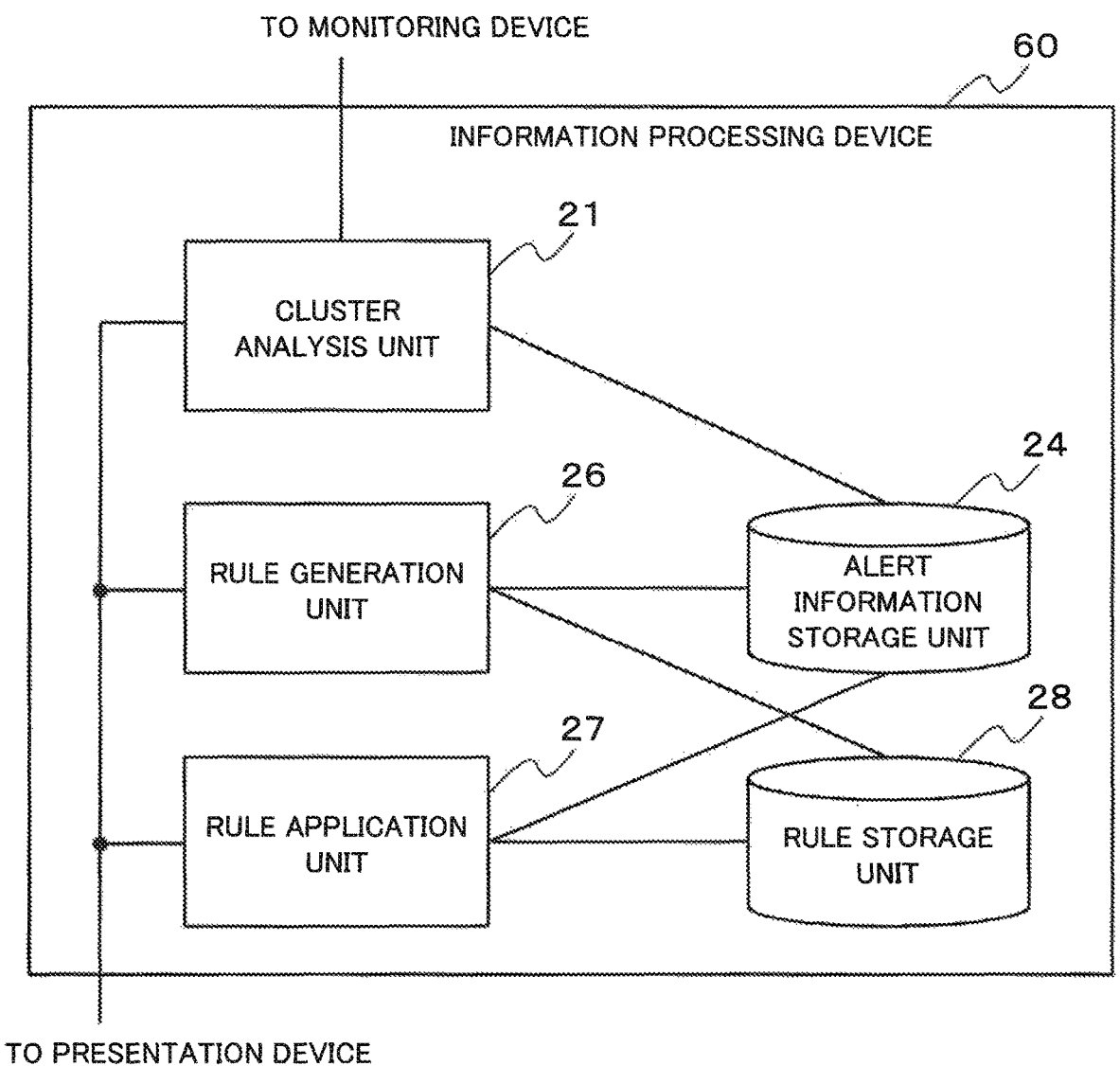
FIG. 11 is a block diagram illustrating an example of a configuration of the information processing device according to the second example embodiment.

FIG. 11 is a block diagram illustrating an example of a configuration of the information processing device 60 according to the present example embodiment. As illustrated in FIG. 11, when compared with the information processing device 20 according to the first example embodiment, the information processing device 60 is different in that a rule generation unit 26, a rule application unit 27, and a rule storage unit 28 are included in place of the rule generation unit 22, the rule application unit 23, and the rule storage unit 25.

The rule generation unit 26 generates the classification rule 550, similarly to the rule generation unit 22 according to the first example embodiment. However, when compared with the rule generation unit 22, the rule generation unit 26 is different in an operation of saving the classification rule 550. More specifically, the rule generation unit 26 is different in an operation of deleting the old classification rule 550 stored in the rule storage unit 28 when saving the generated classification rule 550 in the rule storage unit 28.

In other words, the rule generation unit 26 deletes the classification rule 550 with the valid flag 510 of "0 (invalid)", in other words, the invalid classification rule 550, among the old classification rules 550 stored in the rule storage unit 28. As a result, the classification rule 550 with the valid flag 510 of "1 (valid)" is stored.

Note that the rule generation unit 22 according to the first example embodiment stores the generated classification rule 500 in the rule storage unit 25 after deleting the classification rule 500 stored in the rule storage unit 25. Thus, the classification rules 500 stored by the rule generation unit 22 do not overlap with one another.

On the other hand, the rule generation unit 26 stores the generated classification rule 550 while leaving the valid classification rule 550, and thus, there is a possibility of saving a plurality of identical classification rules 550.

In view of the above, when saving the generated classification rule 550, the rule generation unit 26 checks overlapping of the classification rules 550 and stores the classification rule 550 that is not overlapped.

More specifically, the rule generation unit 26 determines overlapping of the classification rules 550, based on comparison of the condition part 501 and the classification operation part 509 between each of the generated classification rules 550 and each of the classification rules 550 stored in the rule storage unit 28.

In other words, the rule generation unit 26 checks whether or not the classification rule 550 including the condition part 501 and the classification operation part 509 that are the same as the condition part 501 and the classification operation part 509 of the generated classification rule 550 is stored in the rule storage unit 28. Then, the rule generation unit 26 stores, in the rule storage unit 28, the classification rule 550 including the condition part 501 and the classification operation part 509 that are at least partially different from the condition part 501 and the classification operation part 509 of the classification rule 550 stored in the rule storage unit 28.

Based on the operation described above, the rule generation unit 26 prevents the classification rule 550 in which the valid flag 510 is set to "1 (valid)" from being deleted in processing of saving the generated classification rule 550. Further, the rule generation unit 26 prevents overlapping of the classification rules 550 stored in the rule storage unit 28.

The rule storage unit 28 stores the classification rule 550 generated by the rule generation unit 26 as described above.

The rule application unit 27 applies the classification rule 550, similarly to the rule application unit 23 according to the first example embodiment. However, when compared with the rule application unit 23, the rule application unit 27 is different in applying the classification rule 550 with the valid flag 510 of "1 (valid)" among the classification rules 550. More specifically, the rule application unit 27 uses the classification rule 550 with the valid flag 510 of "1 (valid)", in determination as to whether or not to apply the classification rule 550.

In other words, when collating the alert information (A) with a true detection rule in processing of applying the classification rule 550, the rule application unit 27 uses a true detection rule with the valid flag 510 of "1 (valid)". Similarly, when collating the alert information (A) with a false detection rule, the rule application unit 27 uses a false detection rule with the valid flag 510 of "1 (valid)".

Next, the presentation device 70 according to the present example embodiment will be described with reference to the drawings.

Figure 12:
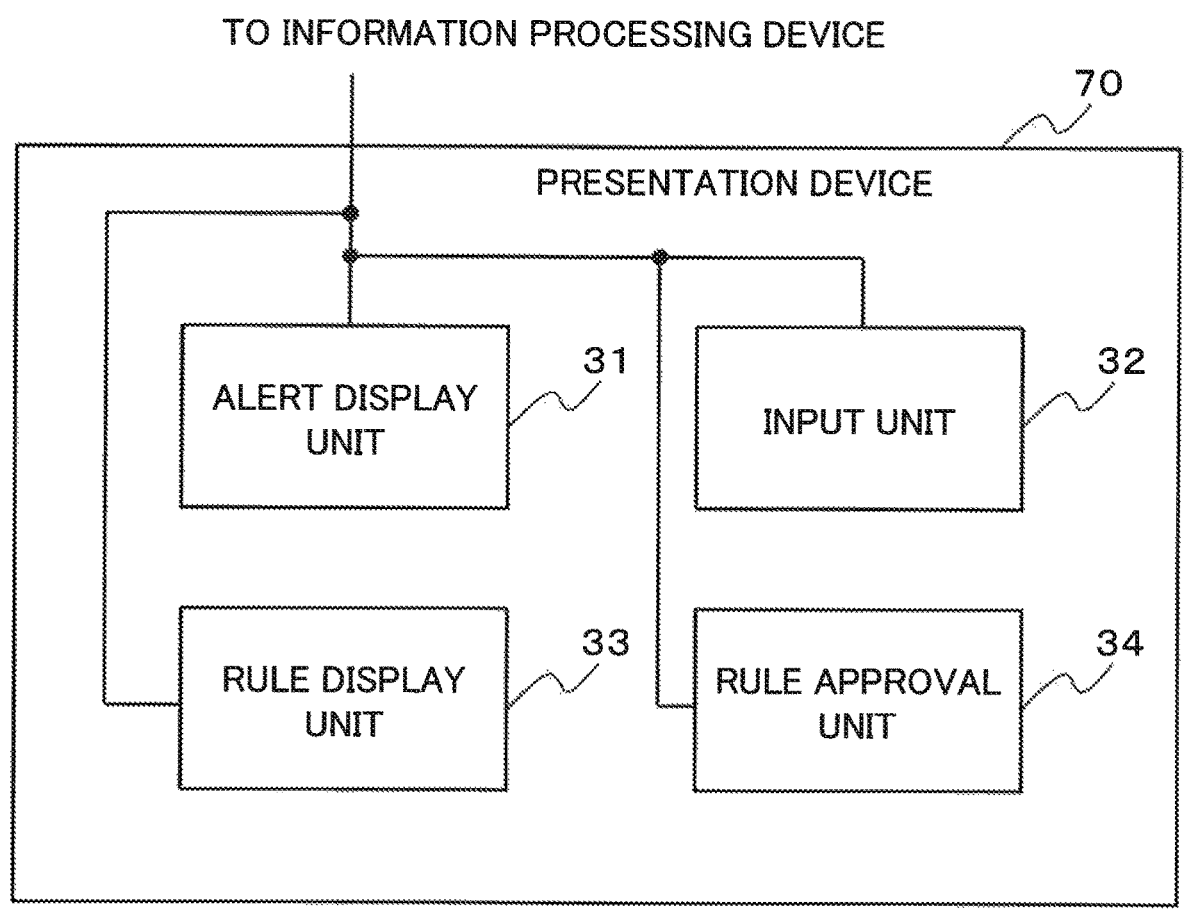
FIG. 12 is a block diagram illustrating an example of a configuration of a presentation device according to the second example embodiment.

FIG. 12 is a block diagram illustrating an example of a configuration of the presentation device 70 according to the second example embodiment. As illustrated in FIG. 12, the presentation device 70 includes a rule display unit 33 and a rule approval unit 34, in addition to the configuration of the presentation device 30 according to the first example embodiment. Thus, detailed description about a configuration and an action similar to those in the first example embodiment will be omitted.

The rule display unit 33 receives the classification rule 550 stored in the rule storage unit 28 from the information processing device 60, and displays the classification rule 550 to an operator of the information processing system 11. In other words, the operator is able to check a content of the classification rule 550 based on display of the rule display unit 33. Note that the rule display unit 33 may display, as information to be presented to the operator, information different from the information included in the classification rule 550. For example, the rule display unit 33 may display, to the operator, a number of occurrence times of a frequent pattern ($P_1$) corresponding to each classification rule 550, in addition to the classification rule 550.

The rule approval unit 34 accepts an input (instruction) for the classification rule 550 from the operator, and transmits a content of the accepted input to the information processing device 60. More specifically, the rule approval unit 34 accepts an instruction of "Valid" or "Invalid" for the classification rule 550 designated by the operator, and transmits the instruction to the information processing device 60.

The information processing device 60 sets or changes the valid flag 510 of the classification rule 550 stored in the rule storage unit 28, based on the instruction received from the presentation device 70. In other words, the operator is able to check, by using the presentation device 70, a content of the classification rule 550 stored by the information processing device 60, and is able to set the valid flag 510 of the classification rule 550.

[Description of Advantageous Effects]

The information processing device 60 according to the present example embodiment can exhibit an advantageous effect of generating the classification rule 550 that can be used more appropriately, in addition to the advantageous effect of the first example embodiment.

The reason is as follows.

The rule generation unit 26 of the information processing device 60 deletes the invalid classification rule 550 and leaves the valid classification rule 550, based on the valid flag 510 of the classification rule 550. In addition, the rule application unit 27 uses the valid classification rule 550 for determination, based on the valid flag 510 of the classification rule 550.

Further, the information processing system 11 that includes the information processing device 60 and the presentation device 70 according to the present example embodiment exhibits an advantageous effect of being capable of changing or setting valid and invalid of the classification rule 550 stored by the information processing device 60, based on an instruction of an operator.

The reason is as follows.

The rule display unit 33 of the presentation device 70 included in the information processing system 11 displays the classification rule 550 stored in the information processing device 60. Then, the rule approval unit 34 of the presentation device 70 is able to receive information relating to valid or invalid of the classification rule 550 and transmit the information to the information processing device 60.

Then, the information processing device 60 sets or changes the valid flag 510 based on the received information.

As described above, the information processing system 11 that includes the information processing device 60 according to the present example embodiment provides an operator with a means that reflects a result of determination of validity of the classification rule 550 on the classification rule 550. Thus, the information processing system 11 can exhibit an advantageous effect of suppressing occurrence of erroneous classification due to excessive application of the classification rule 550.

Third Example Embodiment

Next, an information processing device 80 according to a third example embodiment will be described with reference to the drawings.

Figure 14:
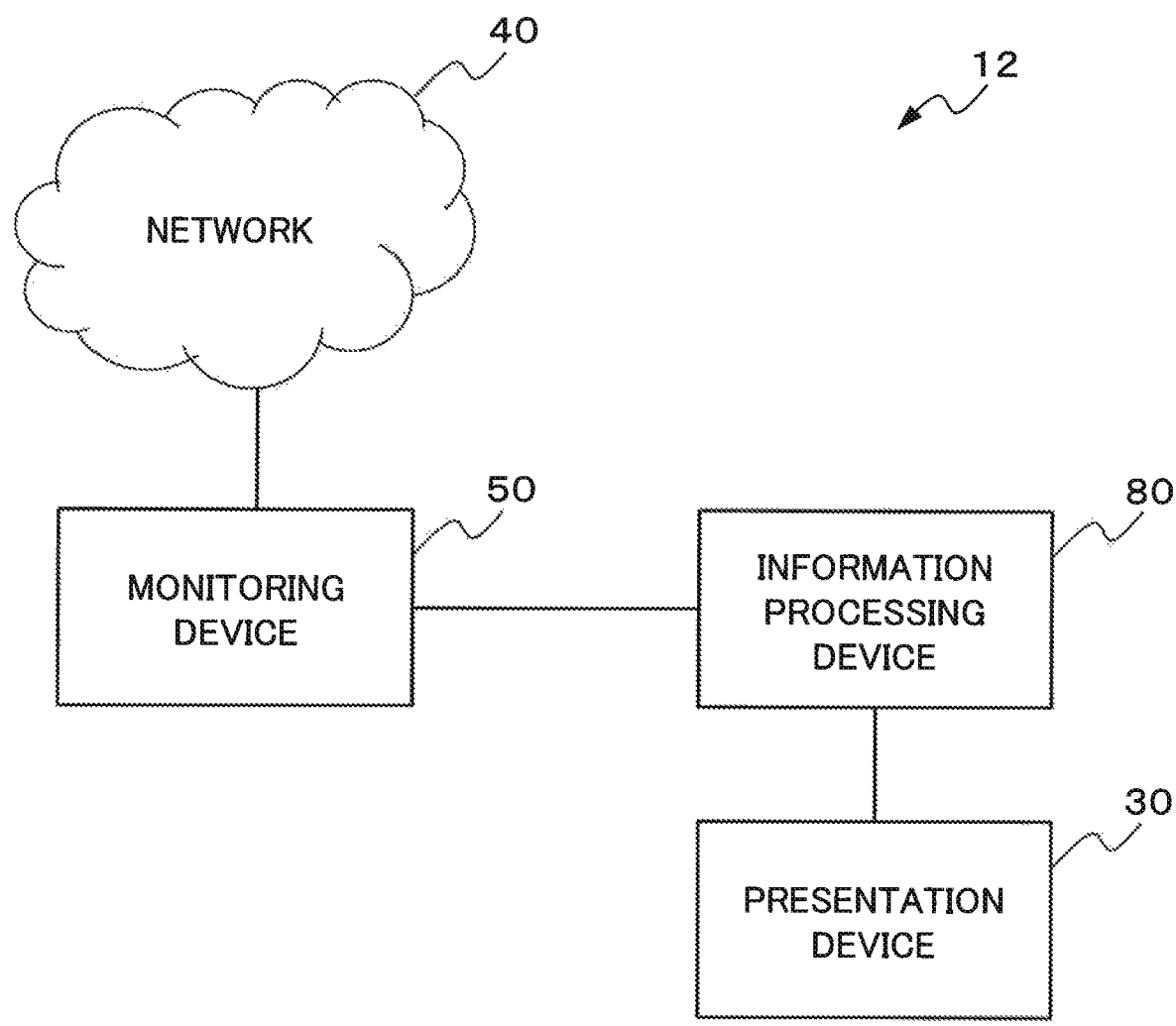
FIG. 14 is a block diagram illustrating an example of a configuration of an information processing system that includes an information processing device according to a third example embodiment.

FIG. 14 is a block diagram illustrating an example of a configuration of an information processing system 12 that includes the information processing device 80 according to the third example embodiment. As illustrated in FIG. 14, when compared with the information processing system 10 according to the first example embodiment, the information processing system 12 is different in that the information processing device 80 is included in place of the information processing device 20. Thus, description of a configuration and an operation similar to those in the first example embodiment will be hereinafter omitted, and a configuration and an operation different from those in the first example embodiment will be mainly described.

Figure 15:
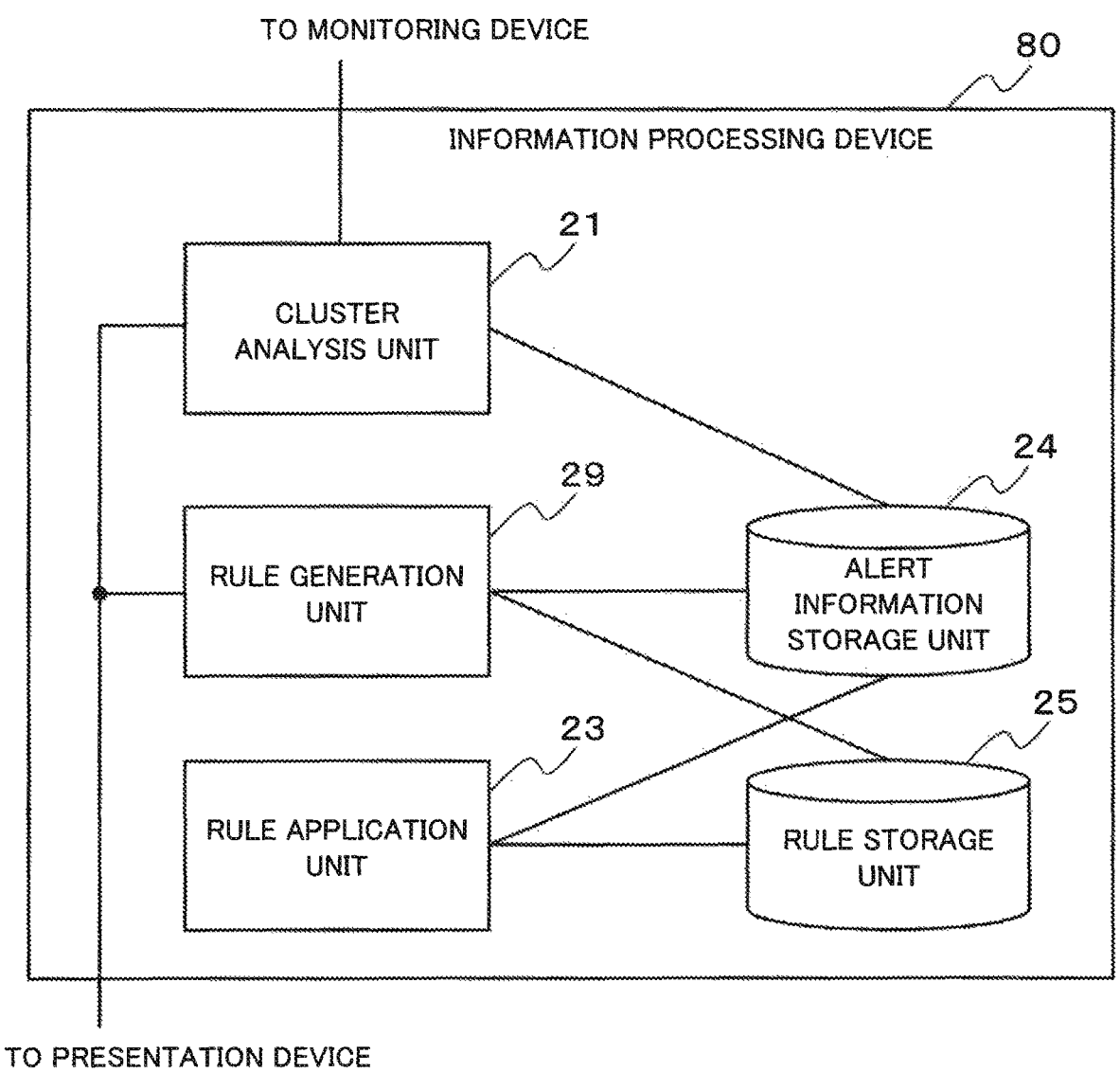
FIG. 15 is a block diagram illustrating an example of a configuration of the information processing device according to the third example embodiment.

FIG. 15 is a block diagram illustrating an example of a configuration of the information processing device 80 according to the third example embodiment. As illustrated in FIG. 15, when compared with the information processing device 20 according to the first example embodiment, the information processing device 80 is different in that a rule generation unit 29 is included in place of the rule generation unit 22.

When compared with the rule generation unit 22, the rule generation unit 29 is different in an operation of generating the classification rule 500. Other operations of the rule generation unit 29 are the same as those of the rule generation unit 22, and thus, detailed description of the other operations will be omitted.

Figure 16:
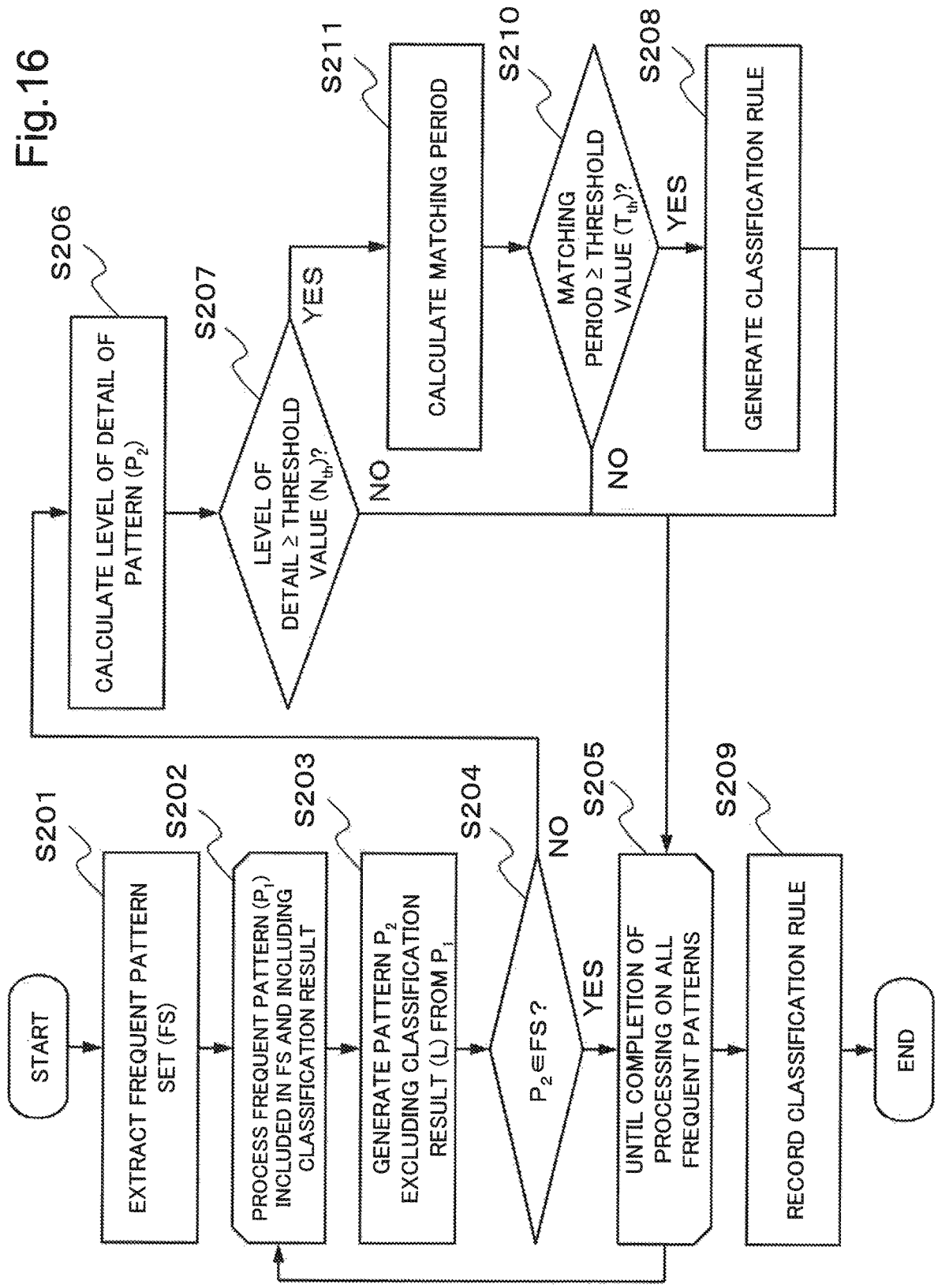
FIG. 16 is a flowchart illustrating an example of an operation of generating a rule in a rule generation unit according to the third example embodiment.

FIG. 16 is a flowchart illustrating an example of an operation of generating a rule in the rule generation unit 29 according to the third example embodiment. As illustrated in FIG. 16, the rule generation unit 29 determines a matching period of the classification rule 500, prior to the operation of generating a rule in Step S208. Other operations of the rule generation unit 29 are the same as those of the rule generation unit 22, and thus, detailed description of the other operations will be omitted, and an operation specific to the present example embodiment will be described.

When the level of detail 610 is equal to or more than a threshold value ($N_{th}$) (YES at Step S207), the rule generation unit 29 calculates a matching period of the pattern ($P_2$) (Step S211).

The matching period herein is a period to be used in determination as to whether or not the rule generation unit 29 uses the pattern ($P_2$) in generation of the classification rule 500. The matching period is a value calculated by the rule generation unit 29 based on the alert information 400. For example, the rule generation unit 29 calculates the matching period as follows.

First, the rule generation unit 29 extracts, among pieces of the alert information 400 used in extraction of the frequent pattern set (FS), the alert information 400 matching with the classification rule 500 having the pattern ($P_2$) as the condition part 501. Next, the rule generation unit 29 extracts an earliest time and a latest time among the detection times 401 included in pieces of the extracted alert information 400. Then, the rule generation unit 29 defines a value calculated by subtracting the extracted earliest time from the extracted latest time as the matching period. In other words, the rule generation unit 29 defines a range of the detection time 401 of the extracted alert information 400 as the matching period.

The pattern ($P_2$) having a short matching period herein is highly likely to be the pattern ($P_2$) based on an alert generated within a short term or suddenly. In other words, the pattern ($P_2$) having a short matching period may have a low possibility of occurrence of an alert matching with the pattern ($P_2$) in the future.

Thus, the rule generation unit 29 is able to determine whether the pattern ($P_2$) is based on an alert generated within a short term or suddenly, or is based on an alert occurring over a long term, by using the matching period calculated as described above. In other words, the rule generation unit 29 is able to suppress, based on the matching period, addition of the classification rule 500 corresponding to the pattern ($P_2$) that has a low possibility of occurrence of a matching alert in the future.

In view of the above, after calculating the matching period, the rule generation unit 29 compares the calculated matching period with a predetermined threshold value ($T_{th}$) (Step S210). This threshold value ($T_{th}$) is a value set in the rule generation unit 29 in advance.

When the matching period is less than the threshold value ($T_{th}$) (NO at Step S210), the rule generation unit 29 does not generate the classification rule 500 corresponding to the pattern ($P_2$), and returns to Step S205.

When the matching period is equal to or more than the threshold value ($T_{th}$) (YES at Step S210), the rule generation unit 29 proceeds to Step S208 and generates the classification rule 500 corresponding to the pattern ($P_2$), similarly to the first example embodiment.

Note that the information processing device 80 may include the functions of the rule generation unit 26, the rule application unit 27, and the rule storage unit 28 included in the information processing device 60 according to the second example embodiment. In other words, the information processing device 80 may use the valid flag 510.

In the description hitherto, the rule generation unit 29 determines whether or not to generate the classification rule 500 by using the matching period. However, determination of the rule generation unit 29 is not necessarily limited to the above. The rule generation unit 29 may use the detection time 401 included in the alert information 400, in determination as to whether or not to generate the classification rule 500. For example, the rule generation unit 29 may not generate the classification rule 500 when a latest time of the detection time 401 of the matching alert information 400 is earlier than a predetermined time, in other words, when an alert is not generated at or after a predetermined time. In other words, the rule generation unit 29 may generate the classification rule 500 for an alert generated earlier by a predetermined period of time than a current time.

[Description of Advantageous Effects]

Next, an advantageous effect of the present example embodiment will be described.

The information processing device 80 according to the third example embodiment can exhibit an advantageous effect of generating the more appropriate classification rule 500, in addition to the advantageous effect of the first example embodiment.

The reason is as follows.

The rule generation unit 29 of the information processing device 80 according to the present example embodiment uses the matching period relating to the pattern ($P_2$), in generation of the classification rule 500. More specifically, the rule generation unit 29 does not add the classification rule 500 relevant to the pattern ($P_2$) having the matching period shorter than the predetermined threshold value ($T_{th}$). In other words, the rule generation unit 29 suppresses generation of the classification rule 500 corresponding to the pattern ($P_2$) based on an alert generated within a short term or suddenly.

Thus, based on the operation described above, the rule generation unit 29 is able to suppress increase in the number of the classification rules 500 and increase in processing cost along with the increase in the number of the classification rules 500.

Modification Examples

The information processing device 20, the information processing device 60, and the information processing device 80 (hereinafter described collectively as the information processing device 20) described above are configured as follows.

For example, each of the configuration units of the information processing device 20 may be configured with a hardware circuit.

Alternatively, the information processing device 20 may be configured to include the configuration units by using a plurality of not-illustrated devices connected through a network. For example, the information processing device 20 may be configured to include the alert information storage unit 24 and/or the rule storage unit 25 as a not-illustrated external storage device.

FIG. 18 is a block diagram illustrating an example of a configuration of an information processing device 90 according to a first modification example of the information processing device 20.

The information processing device 90 is configured to include the alert information storage unit 24 and the rule storage unit 25 as a not-illustrated external storage device connected through a network and the like.

Thus, the information processing device 90 includes the cluster analysis unit 21, the rule generation unit 22, and the rule application unit 23. The units included in the information processing device 90 are similar to those in the first example embodiment.

The information processing device 90 configured as above can acquire an advantageous effect similar to that of the information processing device 20.

The reason is that the configurations included in the information processing device 90 can operate similarly to the configurations of the information processing device 20 by using the alert information storage unit 24 and the rule storage unit 25 provided in an external storage device.

Note that the information processing device 90 is a minimum configuration of the example embodiment of the present invention.

Alternatively, the information processing device 20 may be configured to include a plurality of configuration units with one piece of hardware.

In addition, the information processing device 20 may be implemented as a computer device that includes a central processing unit (CPU), a read only memory (ROM), and a random access memory (RAM). The information processing device 20 may be implemented as a computer device that further includes, in addition to the above-described configurations, an input and output circuit (IOC) and a network interface circuit (NIC).

Figure 17:
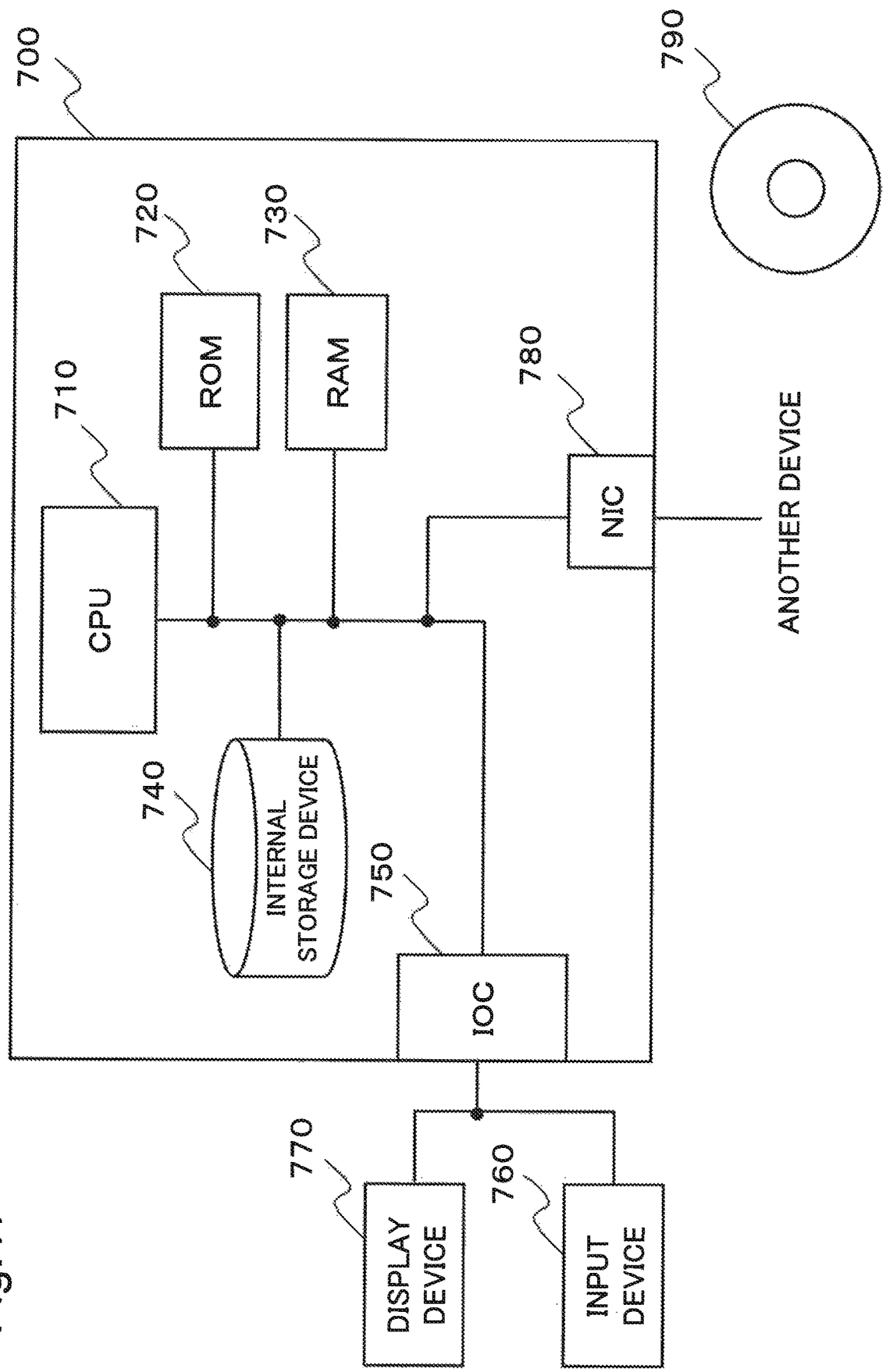
FIG. 17 is a block diagram illustrating an example of a configuration of an information processing device according to a modification example.

FIG. 17 is a block diagram illustrating an example of a configuration of an information processing device 700 according to a second modification example of the information processing device 20. In other words, FIG. 17 is a block diagram illustrating an example of a configuration of the information processing device 700 that is an example when the information processing device 20 is implemented as the above-described computer device.

The information processing device 700 includes a CPU 710, a ROM 720, a RAM 730, an internal storage device 740, an IOC 750, and an NIC 780, and configures a computer.

The CPU 710 reads a program from the ROM 720. Then, the CPU 710 controls the RAM 730, the internal storage device 740, the IOC 750, and the NIC 780, based on the read program. Then, the computer including the CPU 710 controls these configurations, and implements the functions as the cluster analysis unit 21, the rule generation unit 22, and the rule application unit 23, which are illustrated in FIG. 2.

The CPU 710 may use the RAM 730 or the internal storage device 740 as a temporary memory for a program when implementing the functions.

In addition, the CPU 710 may read a program included in a storage medium 790 that stores the program in a computer-readable way, by using a not-illustrated storage medium reading device. Alternatively, the CPU 710 may receive a program from a not-illustrated external device via the NIC 780, store the program in the RAM 730, and operate based on the stored program.

The ROM 720 stores a program and static data to be executed by the CPU 710. The ROM 720 is a programmable-ROM (P-ROM) or a Flash ROM, for example.

The RAM 730 temporarily stores a program and data to be executed by the CPU 710. The RAM 730 is a dynamic-RAM (D-RAM), for example.

The internal storage device 740 stores data and a program to be stored over a long term by the information processing device 700. In addition, the internal storage device 740 may operate as a temporary storage device of the CPU 710. The internal storage device 740 operates as the alert information storage unit 24 and the rule storage unit 25. The internal storage device 740 is a hard disk device, a magneto-optical disk device, a solid state drive (SSD), or a disk array device, for example.

The ROM 720 and the internal storage device 740 herein are non-transitory storage media. On the other hand, the RAM 730 is a transitory storage medium. Then, the CPU 710 is capable of operating based on a program stored in the ROM 720, the internal storage device 740, or the RAM 730. In other words, the CPU 710 is capable of operating by using a non-transitory storage medium or a transitory storage medium.

The IOC 750 intermediates data of the CPU 710 and data of an input device 760 and a display device 770. The IOC 750 is an IO interface card or a universal serial bus (USB) card, for example.

The input device 760 is a device that receives an input instruction from an operator of the information processing device 700. The input device 760 is a keyboard, a mouse, or a touch panel, for example.

The display device 770 is a device that displays information to an operator of the information processing device 700. The display device 770 is a liquid crystal display, for example.

The NIC 780 relays exchange of data with a not-illustrated external device via a network. The NIC 780 is a local area network (LAN) card, for example.

The information processing device 700 configured as above can acquire an advantageous effect similar to that of the information processing device 20.

The reason is that the CPU 710 of the information processing device 700 is able to implement a function similar to that of the information processing device 20, based on a program.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2015-128769, filed on Jun. 26, 2017, the disclosure of which is incorporated herein in its entirety by reference.

REFERENCE SINGS LIST

10 Information processing system
11 Information processing system
12 Information processing system
20 Information processing device
21 Cluster analysis unit
22 Rule generation unit
23 Rule application unit
24 Alert information storage unit
25 Rule storage unit
26 Rule generation unit
27 Rule application unit
28 Rule storage unit
29 Rule generation unit
30 Presentation device
31 Alert display unit
32 Input unit
33 Rule display unit
34 Rule approval unit
40 Network
50 Monitoring device
60 Information processing device
70 Presentation device
80 Information processing device
90 Information processing device
400 Alert information
401 Detection time
402 Transmission-source IP address
403 Transmission-source port number
404 Transmission-destination IP address
405 Transmission-destination port number
406 Detection rule identifier
407 Cluster identifier
408 Classification result
409 Communication information
500 Classification rule
501 Condition part
502 Transmission-source IP address
503 Transmission-source port number
504 Transmission-destination IP address
505 Transmission-destination port number
506 Detection rule identifier
507 Cluster identifier
508 Classification result
509 Classification operation part
510 Valid flag
550 Classification rule
600 Frequent pattern set
601 Frequent pattern
602 Transmission-source IP address
603 Transmission-source port number
604 Transmission-destination IP address
605 Transmission-destination port number
606 Detection rule identifier
607 Cluster identifier
608 Classification result
609 Number of occurrence times
610 Level of detail
700 Information processing device
710 CPU
720 ROM
730 RAM
740 Internal storage device
750 IOC
760 Input device
770 Display device
780 NIC
790 Storage medium

What is claimed is:

1. An information processing device comprising:
a memory storing instructions; and
a processor configured to execute the instructions to control:
a cluster analyzer that determines, based on communication information that is communicated information included in an alert, a cluster identifier indicating a cluster, among a plurality of clusters, that is a result of clustering the alert into one cluster among the plurality of clusters based on the communication information, receives a classification result that is a classification as to whether the alert is true detection or false detection, and generates alert information that includes the alert, the cluster identifier, and the classification result;
a rule generator that calculates, for the alert information, a number of occurrence times of a pattern that is a combination of information included in the alert information and includes the cluster identifier, extracts a frequent pattern that is a pattern with a larger number of occurrence times than a predetermined threshold value, generates, based on the frequent pattern extracted, a classification rule used in setting or updating of the classification result associated with the alert, and updates a previously generated old classification rule with a newly generated classification rule; and
a rule applicator that sets or updates the classification result included in the alert information, based on the classification rule,
wherein
the alert information further includes a detection time at which the alert is detected, and
the rule generator selects the frequent pattern for use in generation of the classification rule, based on a detection time of the alert information matching with the frequent pattern.

2. The information processing device according to claim 1, wherein
the cluster analyzer determines the cluster identifier based on similarity of the communication information.

3. The information processing device according to claim 1, wherein
the rule generator generates the classification rule for the frequent pattern, based on the frequent pattern in which the classification result included in the frequent pattern is identical.

4. The information processing device according to claim 1, wherein
the rule generator calculates a level of detail that is a degree of narrowness of an application range of the alert for the frequent pattern, and generates the classification rule for the frequent pattern having the level of detail larger than a predetermined threshold value.

5. The information processing device according to claim 1, wherein
the classification rule further includes a valid flag indicating whether or not the classification rule is valid,
the rule generator deletes the classification rule in which the valid flag is invalid, and does not delete but updates the classification rule in which the valid flag is valid, when updating the previously generated old classification rule with the newly generated classification rule, and
the rule applicator sets or updates the classification result associated with the alert, based on the classification rule in which the valid flag is valid.

6. An information processing system comprising:
the information processing device according to claim 1; and
a presentation device that includes
a memory storing instructions; and
a processor configured to execute the instructions to control:
an alert display that receives the alert information from the information processing device, and displays the received alert information, and
an inputter that receives an input of the classification result for the displayed alert information, and transmits the received input to the information processing device.

7. The information processing system according to claim 6, wherein
the presentation device further includes
a rule display that receives the classification rule from the information processing device, and displays the received classification rule, and
a rule approver that receives an instruction of valid or invalid for the displayed classification rule, and transmits the received instruction to the information processing device.

8. An information processing method comprising:
determining, using an information processing device, based on communication information that is communicated information included in an alert, a cluster identifier indicating a cluster, among a plurality of clusters, that is a result of clustering the alert into one cluster among the plurality of clusters based on the communication information;
receiving, using the information processing device, a classification result that is a classification as to whether the alert is true detection or false detection;
generating, using the information processing device, alert information that includes the alert, the cluster identifier, and the classification result;
calculating, using the information processing device, for the alert information, a number of occurrence times of a pattern that is a combination of information included in the alert information and includes the cluster identifier;
extracting, using the information processing device, a frequent pattern that is a pattern with a larger number of occurrence times than a predetermined threshold value;
generating, using the information processing device, based on the frequent pattern extracted, a classification rule used in setting or updating of the classification result associated with the alert;
updating, using the information processing device, a previously generated old classification rule with a newly generated classification rule; and
setting or updating, using the information processing device, the classification result included in the alert information, based on the classification rule,
wherein
the alert information further includes a detection time at which the alert is detected, and
the frequent pattern for use in generation of the classification rule is selected based on a detection time of the alert information matching with the frequent pattern.

9. A computer readable non-transitory storage medium embodying a program causing a computer to perform a method, the method comprising:
determining, based on communication information that is communicated information included in an alert, a cluster identifier indicating a cluster, among a plurality of clusters, that is a result of clustering the alert into one cluster among the plurality of clusters based on the communication information;
receiving a classification result that is a classification as to whether the alert is true detection or false detection;
generating alert information that includes the alert, the cluster identifier, and the classification result;
calculating, for the alert information, a number of occurrence times of a pattern that is a combination of information included in the alert information and includes the cluster identifier;
extracting a frequent pattern that is a pattern with a larger number of occurrence times than a predetermined threshold value;
generating, based on the frequent pattern extracted, a classification rule used in setting or updating of the classification result associated with the alert;
updating a previously generated old classification rule with a newly generated classification rule; and
setting or updating the classification result included in the alert information, based on the classification rule,
wherein
the alert information further includes a detection time at which the alert is detected, and
the frequent pattern for use in generation of the classification rule is selected based on a detection time of the alert information matching with the frequent pattern.

* * * * *